United States Patent
Leiber et al.

(10) Patent No.: US 7,151,623 B2
(45) Date of Patent: Dec. 19, 2006

(54) HOLOGRAPHIC DATA-STORAGE MEDIUM

(75) Inventors: Jorn Leiber, Hamburg (DE); Anna Blazejewski, Hamburg (DE); Steffen Noehte, Weinheim (DE); Stefan Stadler, Hamburg (DE); Christoph Dietrich, Heidelberg (DE); Matthias Gerspach, Dossenheim (DE)

(73) Assignee: Tesa Scribos GmbH, Heidelberg (DE)

( * ) Notice: Subject to any disclaimer, the term of this patent is extended or adjusted under 35 U.S.C. 154(b) by 0 days.

(21) Appl. No.: 10/480,817

(22) PCT Filed: Feb. 25, 2002

(86) PCT No.: PCT/EP02/01951

§ 371 (c)(1),
(2), (4) Date: Dec. 15, 2003

(87) PCT Pub. No.: WO02/103689

PCT Pub. Date: Dec. 27, 2002

(65) Prior Publication Data

US 2004/0145788 A1   Jul. 29, 2004

(30) Foreign Application Priority Data

Jun. 15, 2001  (DE) ............................. 101 28 902

(51) Int. Cl.
  *G03H 1/02*   (2006.01)
(52) U.S. Cl. .................. 359/3; 359/6; 359/22; 359/1; 430/1
(58) Field of Classification Search .............. 359/3, 359/1, 6, 9, 22; 430/1, 2
See application file for complete search history.

(56) References Cited

U.S. PATENT DOCUMENTS

| 3,288,389 | A | 11/1966 | Gersch et al. |
| 3,823,276 | A | 7/1974 | Maslowski et al. |
| 3,976,354 | A | 8/1976 | Braitberg et al. |
| 4,069,049 | A | 1/1978 | Reich et al. |
| 4,085,501 | A | 4/1978 | Currie |
| 4,252,400 | A | 2/1981 | Bernal et al. |
| 4,320,489 | A | 3/1982 | Crandall et al. |
| 4,368,979 | A | 1/1983 | Ruell |
| 4,370,391 | A | 1/1983 | Mori et al. |
| 4,450,553 | A | 5/1984 | Holster et al. |

(Continued)

FOREIGN PATENT DOCUMENTS

DE   2910390   10/1979

(Continued)

OTHER PUBLICATIONS

Inhaltsverzeichnis CHIP 9/98, Nov. 1999 Pich Klebe für mehr Gigabyte.

(Continued)

*Primary Examiner*—Fayez G. Assaf
(74) *Attorney, Agent, or Firm*—Nixon & Vanderhye, PC

(57) ABSTRACT

In an example holographic data storage medium, which has a polymer film which serves as a storage layer and can be changed locally by heating, the polymer film is set up as a top layer of the data storage medium. Arranged underneath the polymer film is an absorber layer which has an absorber dye. The absorber dye is set up to at least partly absorb a write beam serving to put information in and to discharge the heat produced in the process at least partly locally to the polymer film. In an advantageous refinement of the example data storage medium, there is an adhesive layer underneath the absorber layer and a partly transparent reflective layer between the polymer film and the absorber layer.

25 Claims, 3 Drawing Sheets

U.S. PATENT DOCUMENTS

| | | |
|---|---|---|
| 4,548,889 A | 10/1985 | Nemoto et al. |
| 4,581,317 A | 4/1986 | Simmons, III |
| 4,599,718 A | 7/1986 | Nakagawa et al. |
| 4,638,335 A | 1/1987 | Smith et al. |
| 4,651,172 A | 3/1987 | Watanabe et al. |
| 4,666,819 A | 5/1987 | Elmasry |
| 4,773,060 A | 9/1988 | Shimada et al. |
| 4,800,112 A | 1/1989 | Kano et al. |
| 4,837,745 A | 6/1989 | Eich et al. |
| 4,860,273 A | 8/1989 | Sawano et al. |
| 4,883,741 A | 11/1989 | Takahashi et al. |
| 4,918,682 A | 4/1990 | Finegan |
| 4,933,221 A | 6/1990 | Nishimura et al. |
| 4,939,035 A | 7/1990 | Swofford |
| 4,970,707 A | 11/1990 | Hara et al. |
| 5,014,259 A | 5/1991 | Goldberg et al. |
| 5,019,476 A | 5/1991 | Kanno et al. |
| 5,023,859 A | 6/1991 | Eich et al. |
| 5,034,943 A | 7/1991 | Antonov et al. |
| 5,049,462 A | 9/1991 | Funhoff et al. |
| 5,063,555 A | 11/1991 | Miyoshi et al. |
| 5,070,488 A | 12/1991 | Fukushima et al. |
| 5,077,724 A | 12/1991 | Gregg |
| 5,090,008 A | 2/1992 | Clark et al. |
| 5,090,009 A | 2/1992 | Hamada et al. |
| 5,098,803 A | 3/1992 | Monroe et al. |
| 5,098,975 A | 3/1992 | Omelis et al. |
| 5,109,374 A | 4/1992 | Tsunoda et al. |
| 5,124,183 A | 6/1992 | Nakano et al. |
| 5,138,604 A | 8/1992 | Umeda et al. |
| 5,175,045 A | 12/1992 | Henry et al. |
| 5,188,863 A | 2/1993 | De Graaf et al. |
| 5,205,178 A | 4/1993 | Odernheimer |
| 5,215,800 A | 6/1993 | Daido et al. |
| 5,234,799 A | 8/1993 | Nagae et al. |
| 5,272,689 A | 12/1993 | Tsujioka et al. |
| 5,289,407 A | 2/1994 | Strickler et al. |
| 5,297,132 A | 3/1994 | Takano et al. |
| 5,300,169 A | 4/1994 | Tahara |
| 5,311,499 A | 5/1994 | Hwang |
| 5,312,713 A | 5/1994 | Yokoyama et al. |
| 5,368,789 A | 11/1994 | Kamitakahara et al. |
| 5,369,631 A | 11/1994 | Hwang |
| 5,382,463 A | 1/1995 | Adkins et al. |
| 5,447,767 A | 9/1995 | Tanabe et al. |
| 5,459,019 A | 10/1995 | Kato et al. |
| 5,508,143 A | 4/1996 | Taniguchi et al. |
| 5,509,991 A | 4/1996 | Choi |
| 5,510,171 A | 4/1996 | Faykish |
| 5,519,517 A | 5/1996 | Redfield et al. |
| 5,572,492 A | 11/1996 | Ogawa |
| 5,587,993 A | 12/1996 | Gregg |
| 5,627,817 A | 5/1997 | Rosen et al. |
| 5,639,588 A | 6/1997 | Huh |
| 5,658,411 A | 8/1997 | Faykish |
| 5,669,995 A | 9/1997 | Hong |
| 5,702,805 A | 12/1997 | Yin et al. |
| 5,744,219 A | 4/1998 | Tahara |
| 5,764,583 A | 6/1998 | Cliff et al. |
| 5,797,492 A | 8/1998 | Seki et al. |
| 5,800,950 A | 9/1998 | Hirao et al. |
| 5,838,653 A | 11/1998 | Fan et al. |
| 5,843,626 A | 12/1998 | Ohta et al. |
| 5,851,615 A | 12/1998 | Kay |
| 5,855,979 A | 1/1999 | Umehara et al. |
| 5,866,236 A | 2/1999 | Faykish et al. |
| 5,871,881 A | 2/1999 | Nishida et al. |
| 5,879,774 A | 3/1999 | Taylor et al. |
| 5,890,674 A | 4/1999 | Major |
| 5,958,650 A | 9/1999 | Wolleb et al. |
| 5,998,007 A | 12/1999 | Prutkin et al. |
| 6,016,210 A | 1/2000 | Stappaerts |
| 6,016,984 A | 1/2000 | Trafton et al. |
| 6,154,432 A | 11/2000 | Faruqi et al. |
| 6,168,682 B1 | 1/2001 | Bennett et al. |
| 6,226,415 B1 | 5/2001 | Wilson et al. |
| 6,236,589 B1 | 5/2001 | Gupta et al. |
| 6,266,166 B1 | 7/2001 | Katsumata et al. |
| 6,310,850 B1 | 10/2001 | Sochava et al. |
| 6,338,935 B1 | 1/2002 | Alperovich et al. |
| 6,364,233 B1 | 4/2002 | Crowley |
| 6,372,341 B1 | 4/2002 | Jung et al. |
| 6,383,690 B1 | 5/2002 | Vargas |
| 6,386,458 B1 | 5/2002 | Leiber et al. |
| 6,436,483 B1 | 8/2002 | Palmasi et al. |
| 6,450,642 B1 | 9/2002 | Jethmalani et al. |
| 6,452,890 B1 | 9/2002 | Kawano et al. |
| 6,614,741 B1 | 9/2003 | Hesselink et al. |
| 6,614,742 B1 | 9/2003 | Ueyanagi |
| 6,714,437 B1 | 3/2004 | Leiber et al. |
| 6,723,259 B1 | 4/2004 | Groth et al. |
| 6,789,262 B1 | 9/2004 | Leiber et al. |
| 6,805,934 B1 | 10/2004 | Ohtaki et al. |
| 6,830,850 B1 | 12/2004 | Krivokapic et al. |
| 6,881,476 B1 | 4/2005 | Noehte et al. |
| 6,958,836 B1 | 10/2005 | Leiber et al. |
| 2002/0005888 A1 | 1/2002 | Obata et al. |
| 2003/0031112 A1 | 2/2003 | Horimai |
| 2003/0063342 A1 | 4/2003 | Horimai |
| 2003/0096105 A1 | 5/2003 | Noehte et al. |
| 2003/0124436 A1 | 7/2003 | Shioda et al. |
| 2003/0142619 A1 | 7/2003 | Mussig et al. |
| 2003/0156524 A1 | 8/2003 | Stadler et al. |
| 2003/0161018 A1 | 8/2003 | Stadler et al. |
| 2003/0165105 A1 | 9/2003 | Leiber et al. |
| 2003/0165746 A1 | 9/2003 | Stadler et al. |
| 2003/0169674 A1 | 9/2003 | Leiber et al. |
| 2003/0179277 A1 | 9/2003 | Stadler et al. |
| 2003/0235136 A1 | 12/2003 | Akselrod et al. |
| 2004/0001400 A1 | 1/2004 | Amble et al. |
| 2004/0009406 A1* | 1/2004 | Hesselink et al. ............. 430/1 |
| 2004/0030732 A1 | 2/2004 | Gerspach et al. |
| 2004/0036187 A1 | 2/2004 | Leiber et al. |
| 2004/0051919 A1 | 3/2004 | Noehte et al. |
| 2004/0053140 A1 | 3/2004 | Stadler et al. |
| 2004/0066546 A1 | 4/2004 | Noehte et al. |
| 2004/0136037 A1 | 7/2004 | Leiber et al. |
| 2004/0136040 A1 | 7/2004 | Noehte et al. |
| 2004/0145788 A1 | 7/2004 | Leiber et al. |
| 2004/0150802 A1 | 8/2004 | Noehte et al. |

FOREIGN PATENT DOCUMENTS

| | | |
|---|---|---|
| DE | 3110583 | 1/1982 |
| DE | 37 23 522 A | 2/1989 |
| DE | 3810722 A1 | 10/1989 |
| DE | 3920420 A1 | 1/1991 |
| DE | 195 37 829 C2 | 10/1996 |
| DE | 68926896 | 12/1996 |
| DE | 69222527 | 4/1998 |
| DE | 198 08 288 A1 | 9/1999 |
| DE | 29816802 | 2/2000 |
| DE | 19935776 | 2/2001 |
| DE | 19947782 | 4/2001 |
| DE | 10039370 | 2/2002 |
| DE | 10039374 | 2/2002 |
| DE | 10039372 | 3/2002 |
| DE | 101 28 902 A1 | 10/2003 |
| EP | 0 323 167 | 7/1989 |
| EP | 0 352 194 | 1/1990 |
| EP | 0 360 144 | 3/1990 |
| EP | 0 384 041 | 8/1990 |
| EP | 0 938 255 | 11/1990 |
| EP | 0 403 971 | 12/1990 |

| | | |
|---|---|---|
| EP | 0 421 761 | 4/1991 |
| EP | 0 458 604 | 11/1991 |
| EP | 0 475 336 | 3/1992 |
| EP | 0 514 589 | 11/1992 |
| EP | 0 519 633 | 12/1992 |
| EP | 0 528 134 | 2/1993 |
| EP | 0 552 887 | 7/1993 |
| EP | 0 585 076 | 3/1994 |
| EP | 0 613 126 | 8/1994 |
| EP | 0 660 262 A2 | 6/1995 |
| EP | 0 750 308 | 12/1996 |
| EP | 0 768 353 | 4/1997 |
| FR | 2 703 815 A | 10/1994 |
| GB | 2 211 760 A | 7/1989 |
| JP | 55-80832 | 6/1980 |
| JP | 58-155543 | 9/1983 |
| JP | 60-52941 | 3/1985 |
| JP | 61-99981 | 5/1986 |
| JP | 61-145746 | 7/1986 |
| JP | 62-231437 | 10/1987 |
| JP | 63-39381 | 2/1988 |
| JP | 63-304429 | 12/1988 |
| JP | 1-190494 | 7/1989 |
| JP | 1-256042 | 10/1989 |
| JP | 2-98822 | 4/1990 |
| JP | 2-105346 | 4/1990 |
| JP | 2-118632 | 5/1990 |
| JP | 3-23517 | 1/1991 |
| JP | 3-134852 | 6/1991 |
| JP | 3-147540 | 6/1991 |
| JP | 3-164293 | 7/1991 |
| JP | 4-197781 | 7/1992 |
| JP | 04299180 | 10/1992 |
| JP | 5-046061 | 2/1993 |
| JP | 5-109234 | 4/1993 |
| JP | 5109121 | 4/1993 |
| JP | 5-334749 | 12/1993 |
| JP | 6-20292 | 1/1994 |
| JP | 8-273325 | 10/1996 |
| JP | 9-171235 | 6/1997 |
| WO | 93-00224 | 1/1993 |
| WO | 00/09884 | 2/2000 |
| WO | 00/17864 A | 3/2000 |
| WO | 00/54112 | 9/2000 |
| WO | WO 01/04880 A1 | 1/2001 |
| WO | WO 01/84544 A | 11/2001 |
| WO | 02/15179 A | 2/2002 |
| WO | WO 02/46845 A1 | 6/2002 |

OTHER PUBLICATIONS

Ramanujam et al., "Instant Holography" Applied Physics Letters, vol. 74 (21) pp. 3227-3229 (May 1999).

* cited by examiner

HOLOGRAPHIC DATA-STORAGE MEDIUM

This application is the U.S. national phase of international application PCT/EP02/01951, filed in English on 25 Feb. 2002, which designated the U.S. PCT/EP02/01951 claims priority to DE Application No. 101 28 902.2 filed 15 Jun. 2001. The entire contents of these applications are incorporated herein by reference.

BACKGROUND AND SUMMARY

The invention relates to a holographic data storage medium which, for example, can be used for storing pictorial data such as photographs, logos, text and so on but also for the storage of other data.

Contained in a hologram, distributed over the area of the hologram, is optical phase information about an object, from which, when irradiated with light, and in particular coherent light from a laser, an image of the object can be reconstructed. Holograms are used in many and various ways in technology, for example in the form of largely forgery-proof identifiers. Identifiers of this type will be found, for example, on credit cards or check cards; as what are known as white light holograms, even when illuminated with natural light, they show a three-dimensional image of the object depicted. Photographically produced holograms are widespread, as are embossed holograms, in which a relief structure is embossed into the surface of a material, at which the light used to reproduce the object is scattered in accordance with the phase information stored in the hologram, so that the reconstructed image of the object is produced by interference effects.

WO 00/17864 describes a data storage medium with an optical information carrier, which contains a polymer film set up as a storage layer. The polymer film consists, for example, of biaxially oriented polypropylene. In the data storage medium previously disclosed, the polymer film is wound spirally in a plurality of layers onto a core, there being an adhesive layer in each case between adjacent layers. Information can be written into the data storage medium by the polymer film being heated locally with the aid of a write beam from a data drive, as a result of which the refractive index of the polymer film and the reflective capacity at the interface of the polymer film are changed locally. This effect can be amplified by an absorber dye which is added to the adhesive layers, which at least partly absorbs the write beam and discharges the heat produced in the process locally to the polymer film. With the aid of a read beam in the data drive, the changes in the polymer film can be registered, since the read beam is locally reflected more or less intensely at the interface of the polymer film, depending on the information written in. By focusing the write beam or read beam, information can be written specifically into a preselected position on the information carrier or read out from it.

It is an object of the invention to provide a holographic data storage medium which is inexpensive, has wide areas of application and is largely insensitive to external influences.

The holographic data storage medium according to the invention has a polymer film which is set up as a storage layer and which can be changed locally by heating. This polymer film is set up as a top layer of the data storage medium. Arranged underneath the polymer film is an absorber layer, which has an absorber dye which is set up to at least partly absorb a write beam serving to put information in and to discharge the heat produced in the process at least partly locally to the polymer film. The polymer film set up as a storage layer is preferably arranged in one layer in the data storage medium (preferably in a substantially flat arrangement), that is to say, for example, not wound up in a plurality of layers in spiral form.

Since the polymer film is set up as a top layer of the data storage medium, it can serve as the exposed outer side of the data storage medium and protects the generally relatively sensitive absorber layer located underneath. Furthermore, the changes in the polymer film which are effected by heating and using which holographic information is stored are primarily localized in the vicinity of the absorber layer, as explained in more detail further below. Therefore, this region of the polymer film provided with the stored information is likewise located in a protected zone. Undesired influences on the exposed outer side, such as scratches, therefore generally do not have any further effect and, above all, do not lead to a loss of data or to faults when putting information into the data storage medium.

The holographic data storage medium according to the invention is simply constructed, since an additional protective device can generally be dispensed with, and can therefore be produced inexpensively.

An adhesive layer is preferably arranged underneath the absorber layer, and makes it possible to stick the holographic data storage medium onto an object. If the adhesive layer is located immediately underneath the absorber layer, it simultaneously protects the absorber layer and the adjacent region of the polymer film with stored holographic information. The adhesive layer can, for example, contain an adhesive compound comprising an aqueous acrylate emulsion or can consist of functionalized poly(meth)acrylate. Other materials can also be used for the adhesive layer. One preferred thickness of the adhesive layer is about 20 µm, but other thicknesses are also possible.

In an advantageous refinement of the invention, a partly transparent reflective layer is arranged between the storage layer and the absorber layer. The reflective layer can have aluminum and preferably has a thickness in the range from 1 nm to 50 nm, other thicknesses also being possible. It is partly transparent, in order that the write beam penetrates as far as the absorber layer when information is being put in. Since the reflective layer is thin, it virtually does not hinder the discharge of heat to the polymer film. The reflective layer makes it easier to read out the stored holographic information in reflection, which represents a beneficial geometry in most applications. This is explained further below using examples. Furthermore, the reflective layer simplifies the operation of setting the focus of the write beam (see below).

It is also possible to arrange a reflective layer underneath the absorber layer. If there is an adhesive layer, this reflective layer is preferably located between the absorber layer and the adhesive layer. A layer structure of this kind permits the absorber layer to be penetrated in transmission when information is being read out of the holographic data storage medium, so that, for example, the contrast of the read-out signal is amplified if the absorption capacity of the absorber dye within the absorber layer varies in accordance with the information put in (amplitude effect; see below).

Suitable materials for the polymer film are, for example, polypropylene, polyvinylchloride, polyester, polyethylene terephthalate (PET), polyethylene naphthalate, polymethylpentene (PMP; also poly-2-methylpentene) and polyimide. The polymer film preferably has a thickness such that it is self-supporting and can carry out the protective function explained above. Suitable thicknesses lie in the range between 10 µm and 100 µm, but other thicknesses are likewise possible.

The polymer film can be oriented and is preferably biaxially oriented, for example it being pretensioned in two mutually perpendicular directions within its plane during production. This generally increases the strength of the polymer film. Furthermore, in the case of an oriented polymer film, a high energy density is stored in the film material. As a result of local heating with the deposition of a relatively small amount of energy per unit area, for example with the aid of a write beam from a writing device, which is absorbed in the absorber layer, a relatively intense material change with a change in the local properties of the polymer film can be achieved.

In addition to the absorber dye, the absorber layer preferably has a binder. The absorber dye permits local heating of the polymer film which is sufficient to change the local properties of the polymer film with a relatively low intensity of the write beam. The absorber layer can be thin and, for example, have a thickness in the range from 0.1 µm to 5 µm; other thicknesses are likewise possible. Preferred binders, which serve as a matrix for the molecules of the absorber dye are, for example, optically transparent polymers, for example of polymethyl methacrylate (PMMA) or, in the case of applications for higher temperatures, of polymethylpentene, polyether ether ketone (PEEK) or polyether imide. The absorption maximum of the absorber dye should coincide with the light wavelength of the write beam used, in order to achieve efficient absorption. For a light wavelength of 532 nm of a write beam produced by a laser, for example dyes from the Sudan red family (diazo dyes) or (for particularly polar plastics) eosin scarlet are suitable. For the usual laser diodes with a light wavelength of 650 to 660 nm or 685 nm, green dyes, for example from the styryl family (which are usual as laser dyes), are better suited.

There are various possible ways to use the local change in the properties of the polymer film, effected by local heating of the latter, for the storage of information.

In one possible way, the refractive index of the polymer film can be changed locally by heating, it being possible for optical phase information to be stored in the polymer film via the local optical path length. In this case, provision is made to transilluminate the polymer film in transmission when reading out information (it being possible for the reflective layer to be helpful, see below). It is therefore possible to store phase information locally in the polymer film, that is to say in a region provided for the storage of a unit of information, by the refractive index in this region being changed by heating (for example with the aid of a write beam from a writing device). The local change in the refractive index effects a change in the optical path length of the radiation used when reading information out of the polymer film (which transilluminates the polymer film in transmission). The optical path length is specifically the product of the geometric path length and the refractive index. Therefore, via a change in the refractive index, the local phase angle of the radiation used when reading out information can be influenced, that is to say the desired holographic information can be stored as phase information. A hologram produced in the polymer film in this way is accordingly a refractive phase hologram.

In another possible way, the surface structure or interface structure of the polymer film can be changed locally by heating, it being possible for holographic information to be stored via the local interface structure of the polymer film. In this case, therefore, the interface structure or topography of the polymer film, in particular at the interface to the absorber layer or to the reflection layer, pointing away from the exposed outer side of the polymer film, can be changed locally, for example by a laser beam serving as a write beam being focused on to the absorber layer or the interface zone of the polymer film, so that the light energy is absorbed there and converted into heat energy. In particular if the laser beam is radiated in briefly (pulsed), the material change in the polymer film leading to the local change in the interface structure is limited to a very small volume, on account of the generally poor thermal conductivity of the polymer (or of a very thin reflective layer). If the holographic information is put into the polymer film point by point, the region associated with a point typically having linear lateral dimensions of the order of magnitude of 0.5 µm to 1 µm, the height profile of the polymer film typically changes by 50 nm to 500 nm, which depends in detail on the properties and operating conditions of the write beam and the properties of the polymer film, of the absorber layer and possibly of the reflective layer. The point grid, that is to say the center spacing between two points ("pits"), typically lies in the range from 1 µm to 2 µm. In general, it is true that shorter light wavelengths of the write beam permit a closer point grid.

Mixed forms are also conceivable, in which the holographic information can be stored both by a local change in the refractive index and by a local change in the interface structure of the polymer film.

The absorber dye can be set up such that its optical properties are changed locally when it absorbs a write beam serving to put information in. In this case, it is particularly advantageous if the absorber dye changes its absorption capacity locally, that is to say by being bleached partly or completely by the write beam. By means of local variation in the absorption capacity in the absorber layer, the effect achieved in the polymer film by the changes can be reinforced, so that the signal obtained when reading out the holographic data storage medium is more intense or more contrasty than if the absorber layer does not participate in the data storage. The weighting of the individual effects (local refractive index of the polymer film, local interface structure of the polymer film, amplitude effect as a result of locally bleached absorber dye) in the read signal may be influenced or set by choosing the layer structure of the holographic data storage medium. Thus, an amplitude effect is relatively high when a locally bleached absorber layer is transilluminated when information is being read out, such as is the case when a reflective layer is arranged underneath the absorber layer.

The information to be stored can be put into the holographic data storage medium by an item of holographic information contained in a hologram of a stored object being calculated as a two-dimensional arrangement and a write beam from a writing device, preferably a laser lithograph, being aimed at the polymer film and/or the absorber layer of the data storage medium and driven in accordance with the two-dimensional arrangement such that the local properties of the polymer film are set in accordance with the holographic information. Since the physical processes during the scattering of light at a stored object are known, a conventional structure for producing a hologram (in which coherent light from a laser, which is scattered by an object (stored object) is brought to interference with a coherent reference beam and the interference pattern produced in the process is recorded as a hologram) can be simulated for example with the aid of a computer program and the interference pattern or the modulation of the local properties of the polymer film can be calculated as a two-dimensional arrangement (two-dimensional array).

As already explained further above, examples of the local properties of the polymer film which are set in accordance with holographic information are the local refractive index and the local interface structure of the polymer film.

The resolution of a suitable laser lithograph is typically about 50 000 dpi (dots per inch). Therefore, the polymer film can be changed locally in regions or pits with a size of about 0.5 µm to 1 µm. The writing speed and other details depend, inter alia, on the parameters of the write laser (laser power, light wavelength) and the pulse duration and on the properties of the polymer film and the absorber layer.

The write beam is preferably aimed at the holographic data storage medium from the side of the top layer. In this case, it is possible, for example, to put information into the data storage medium if the adhesive layer does not have good optical properties or the data storage medium is bonded to a non-transparent substrate.

If the holographic data storage medium has a partly transparent reflective layer, as explained further above, then, in order to focus the write beam, its reflection from the reflective layer can be evaluated. A comparable reflection would also occur in the case of reflection at the interface between two media with different refractive indices if no reflective layer is arranged there but, in the present case, will be reinforced considerably by the reflective layer. The evaluation can be carried out, for example, via the magnitude of the reflection, measured with the aid of a detector, it being possible for the exact focus setting to be determined, for example, with the aid of calibration measurements. If the reflective layer is very thin (about 1 nm to 50 nm, but also more or less), it can be assumed that the focus of the write beam set to the reflective layer virtually coincides with the optimum focus in the absorber layer. Therefore, when information is put in, the absorber layer can be heated virtually in an optimum way.

As mentioned, the holographic information is preferably put in in the form of pits of predefined size. The term "pit" is to be understood here more generally in the sense of a changed region and not restricted to its original meaning (hole or depression). In this case, the holographic information can be stored in a pit in binary encoded form. This means that, in the region of a given pit, the local properties of the polymer film assume only one of two possible basic forms (basic values). These basic forms preferably differ considerably, in order that intermediate forms which occur in practice and which lie close to one or the other basic form can be assigned unambiguously to one or the other basic form, in order to store the information reliably and unambiguously.

Alternatively, the holographic information can be stored in a pit in continuously encoded form, the local properties of the polymer film in the pit being set in accordance with a value from a predefined value range. If, for example, the local interface structure of the polymer film is to be set, the local maximum height change in the interface structure in the pit is therefore selected from a predefined value range. This means that, in a given pit, the interface structure of the polymer film can assume intermediate forms between two basic forms, so that the maximum height change of the intermediate form which is present assumes a value from a predefined value range whose limits are given by the maximum height changes of the two basic forms. In this case, the information can therefore be stored "in gray steps", so that each pit is assigned the information content of more than one bit. This is correspondingly true of the setting of the local refractive index of the polymer film.

In order to read information out from the holographic data storage medium according to the invention, light, preferably coherent light (for example from a laser) can be aimed at a large area of the storage layer of the data storage medium. In this case, the light is modulated by the locally varying properties of the polymer film (for example the refractive index or the interface structure). As a reconstruction of the information contained in the irradiated region, a holographic image is registered at a distance from the data storage medium, for example by a CCD sensor which is connected to a data processing device.

In principle, the reading operation can be carried out with transmission of the holographic data storage medium, that is to say the data storage medium is transilluminated completely and the holographic image is registered behind the data storage medium. However, for this purpose all the layers of the data storage medium must have a good optical quality, that is to say not just the polymer film but also the absorber layer and an optional adhesive layer. It is therefore more advantageous to read out the information in reflection, the light used for reading being reflected after passing through the polymer film. In this case, the holographic image is produced by light which has passed twice through the polymer film and, in the process, has been modulated, for example by local variations in the refractive index and/or the interface structure of the polymer film. In principle, reading can even be carried out in reflection if there is no separate reflective layer present; the only precondition is the presence of an interface between two media with different refractive indices. However, the reflective layer mentioned between the polymer film and the absorber layer improves the reproduction of the holographic image considerably.

The term "large area" is to be understood to mean an area which is considerably larger than the area of a pit. In this sense, for example an area of 1 mm$^2$ is large. For the scheme in accordance with which information is stored and read out, there are many different possibilities. It is conceivable to read a hologram out of the polymer film in one operation by the entire area of the region of the holographic data storage medium set up as a hologram being irradiated in one operation. In particular in the case of relatively large areas, however, it is advantageous to divide up the information to be stored in to a number or large number of individual regions (for example with a respective area of 1 mm$^2$) and to read out the information in one operation only from a predefined individual region.

During the reading of information, as a result of the locally varying properties of the polymer film, propagation time differences of the light waves originating from various points occur, that is to say substantially periodic phase modulation (which applies in particular in the case of local setting of the refractive index or the interface structure of the polymer film). The region of the polymer film covered by the light acts in the same way as a diffraction grating, which deflects incident light in a defined manner. The deflected light forms an image of the stored object, which constitutes the reconstruction of stored holographic information.

In principle, holographic information from different types of stored objects can be used with the holographic data storage medium. For example, the information contained in images, such as photographs, logos, texts and so on, can be stored and read out. However, the storage of machine-readable data is particularly advantageous. This is carried out, for example, in the form of what are known as data pages, the holographic information contained in a hologram of a graphic bit pattern (which represents the data information) being put as explained into the polymer film serving as a storage layer. During reading, a holographic image of this graphic pattern is produced. The information contained therein can be registered, for example with the aid of a precisely adjusted CCD sensor, and can be processed by associated evaluation software. For the reproduction of images in which high accuracy is not important, a simple matt disk or, for example; a camera with and LCD screen is already in principle sufficient. During the holographic storage of machine-readable data, it is advantageous that the information does not have to be read out sequentially but that an entire data set can be registered in one operation, as explained. If, in spite of the protection by the exposed outer side of the polymer film of the regions of the data storage medium serving to store information, damage nevertheless occurs then, as opposed to a conventional data storage medium, this generally does not lead to a loss of data but merely to impairment of the resolution of the reconstructed holographic image when reading out the information. This is generally not a problem.

BRIEF DESCRIPTION OF THE DRAWINGS

In the following text, the invention will be explained further using exemplary embodiments. In the drawings.

DETAILED DESCRIPTION OF EXAMPLE EMBODIMENTS

Figure 1:
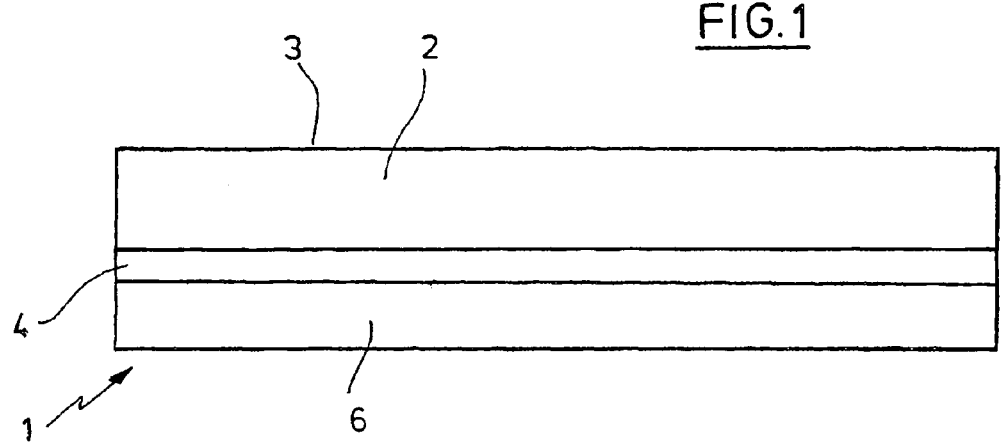
FIG. 1 shows a schematic longitudinal section through a first embodiment of the holographic data storage medium according to the invention.

FIG. 1 illustrates, in a schematic way and not to scale, a detail from a holographic data storage medium 1 according to a first embodiment in longitudinal section. The data storage medium 1 contains a polymer film 2 which serves simultaneously as a storage layer and as a top layer with an exposed outer side 3. In the exemplary embodiment, the polymer film 2 is self-supporting. Arranged underneath the polymer film 2 and adjacent to the polymer film 2 is an absorber layer 4 with an absorber dye. Underneath it there is an adhesive layer 6 which, in the delivered state of the data storage medium 1, is preferably covered by a film that can be pulled off or silicone paper. The terms "above" and "below" relate here and in the following text to the illustration in the figures; however, the data storage medium can also be arranged in any other orientation.

In the exemplary embodiment, the polymer film 2 is a biaxially oriented film of polypropylene (BOPP) with a thickness of 35 μm. Thinner or thicker films are likewise conceivable. Films of other materials are also suitable, as explained further above.

The absorber layer 4 in the exemplary embodiment contains polymethyl methacrylate (PMMA) as binder, to which the absorber dye Sudan red 7B is added. In the exemplary embodiment, the absorber layer is produced from a solution of 10.5% by mass of polymethyl methacrylate and 1.2% by mass of Sudan red 7B in toluene, which is applied to the underside of the polymer film 2 using a linearly engraved roll. The thickness of the absorber layer is about 0.5 μm and preferably lies in the range from 0.3 μm to 1.0 μm. However, other layer thicknesses are likewise conceivable. In order that the absorber layer 4 adheres better, before the application of the absorber layer 4 the underside of the polymer film 2 can be pre-treated in accordance with a process which is basically known.

The adhesive layer 6 in the exemplary embodiment is produced from an aqueous acrylate dispersion and has a layer thickness of 23±4 μm. Other layer thicknesses are likewise possible, and other adhesive compounds can also be used. The underside of the absorber layer 4 can be pre-treated before the application of the adhesive layer 6, in order to ensure better adhesion of the adhesive layer 6.

The absorber layer 4 and the zones of the polymer film 2 which are changed when information is put in (see below) lie in the internal region of the data storage medium 1 and are protected by the upper region of the polymer film 2 having the outer side 3 and the adhesive layer 6.

Figure 2:
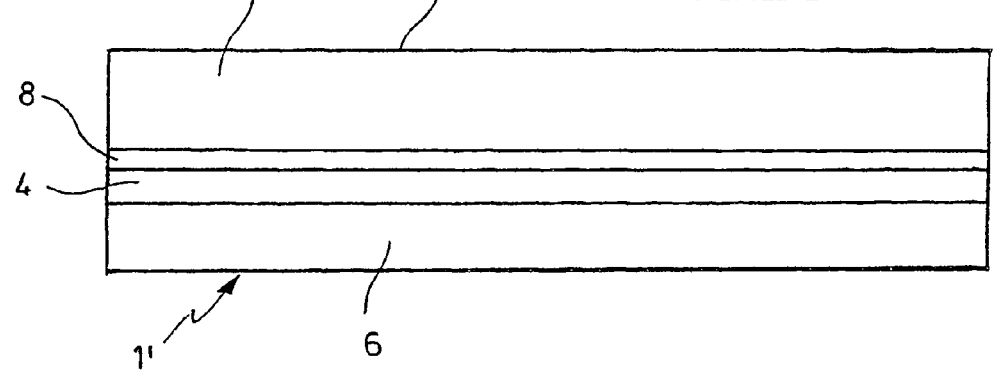
FIG. 2 shows a schematic longitudinal section through a second embodiment of the holographic data storage medium according to the invention.

FIG. 2 is an illustration similar to FIG. 1 of a second embodiment of a holographic data storage medium, which is designated 1' here. Just like the data storage medium 1, the data storage medium 1' has a polymer film 2 (here made of polyethylene terephthalate), which is set up as a storage layer and top layer with an exposed outer side 3, an absorber layer 4 and an adhesive layer 6. In addition, there is a reflective layer 8 between the polymer film 2 and the absorber layer 4.

In the exemplary embodiment, the reflective layer 8 consists of aluminum vapor-deposited on the underside of the polymer film 2 with a thickness such that the result is a transmission of 50%. Preferred layer thicknesses lie in the range from 1 nm to 50 nm, but smaller or larger values are also possible. Given such a low thickness, the reflective layer 8 is partly transparent, so that a write beam aimed at the outer side 3 of the polymer film 2 (for example from a laser lithograph, see below) can pass through the reflective layer 8 in order to reach the absorber layer 4.

As already mentioned, a series of materials are possible for the individual layers of the holographic data storage medium, and the layer thicknesses can also assume a large number of values. Furthermore, additional layers are conceivable. While the polymer film 2 is self-supporting in the case of the data storage media 1 and 1', an additional rigid carrier layer can be provided in another embodiment, for example between the absorber layer and the adhesive layer.

In the exemplary embodiment explained by using FIG. 1, the absorber layer 4 has the absorber dye Sudan red 7B, whose molecules are embedded in a matrix of an optically transparent polymer, specifically polymethyl methacrylate (PMMA), the absorber layer 4 having a thickness of about 0.5 μ. Sudan red 7B absorbs light in the wavelength range around 532 nm particularly well; this wavelength is suitable for a write beam from a laser lithograph for putting information into the data storage medium. Examples of other absorber dyes are specified further above. For example, green dyes, for example from the styryl family, are suitable, particularly for light wavelengths of 635 nm or 650 to 660 nm or 685 nm, at which the laser diodes of current DVD devices operate; laser diodes of this type can be modulated directly, which makes the generation of pulses substantially simpler and cheaper. In the future, the range from 380 to 420 nm could also be of interest if appropriate blue laser diodes can be had commercially and inexpensively. For this purpose, yellow absorber dyes should then preferably be used, such as stilbenes substituted with weak donors and acceptors, donor-substituted nitrobenzenes or coumarin dyes.

The absorber layer 4 has a preferred optical density in the range from 0.2 to 1.0; however, other values are likewise conceivable. The optical density is a measure of the absorption, here based on the light wavelength of a write beam. The optical density is defined as the negative decimal logarithm of the transmission through the absorber layer, which coincides with the product of the extinction coefficient at the wavelength of the write beam used, the concentration of absorber dye in the absorber layer 4 and the thickness of the absorber layer 4.

Figure 3:
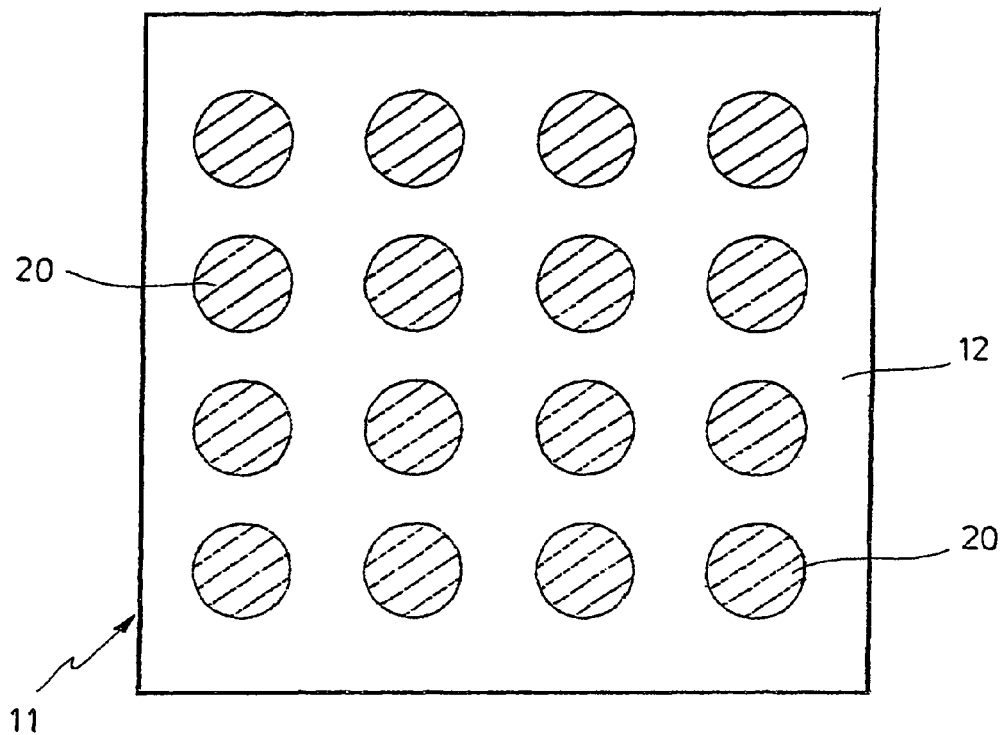
FIG. 3 shows a schematic plan view of a detail of a holographic data storage medium according to the invention in accordance with the second embodiment, in which information can be stored via changes in the refractive index.
Figure 4:
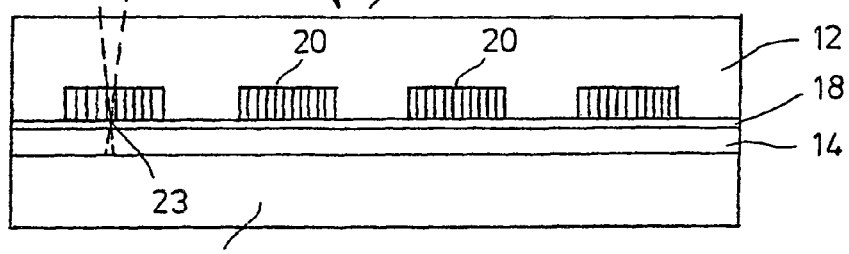
FIG. 4 shows a schematic longitudinal section through the holographic data storage medium from FIG. 3, the input of information being illustrated.
Figure 5:
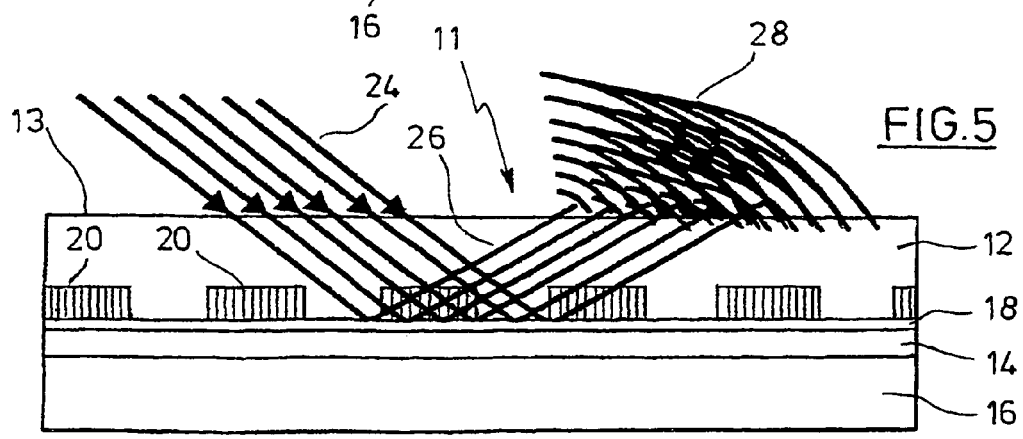
FIG. 5 shows a schematic longitudinal section through the holographic data storage medium from FIG. 3, the reading of information being illustrated.

In the following text, using FIGS. 3 to 5, an explanation will be given as to how information can be put into a holographic data storage medium in accordance with the embodiment described using FIG. 2 and can be read out therefrom. The holographic data storage medium is designated 11 and has a polymer film 12 with an exposed outer side 13, an absorber layer 14, an adhesive layer 16 and a partly transparent reflective layer 18, see FIG. 4. In a way similar to FIGS. 1 and 2, FIGS. 3 to 5 are not to scale. The polymer film 12 here consists of biaxially oriented polyethylene terephthalate (PET) and has a thickness of 50 μm. The refractive index of biaxially oriented polyethylene terephthalate can be changed locally by heating, which is used to store information.

Within the polymer film 12, information is stored in the form of pits 20. In the region of a pit 20, the polymer film 12 has a refractive index which is different from that in the zones between the pits 20. The term "pit" is to be understood here in the sense of a changed region, that is to say more generally than in its original meaning ("hole"). In this case, the information can be stored in a pit in binary encoded form, by the refractive index assuming only two different values (it being possible for one of the two values also to coincide with the refractive index of the polymer film 12 in the zones between the pits 20). It is also possible to store information in a pit 20 in continuously encoded form, it being possible for the refractive index within the pit 20 to assume any desired selected value from a predefined value range. In clear terms, in the case of storage in binary encoded form, a pit is "black" or "white" while, in the case of storage in continuously encoded form, it can also assume all the gray values lying in between.

FIG. 3 is a schematic plan view of a detail from the data storage medium 11, which shows the arrangement of the pits 20 which are produced by the write beam from a laser lithograph (as explained further below using FIG. 4). In the exemplary embodiment, a pit 20 has a diameter of about 0.8 μm. Shapes other than circular pits 20 are likewise possible, for example square or rectangular pits, and also other sizes. The typical dimension of a pit is preferably about 0.5 μm to 2.0 μm. FIG. 3 is therefore a highly enlarged illustration.

FIG. 4 indicates in a schematic way how, with the aid of a write beam 22 from a writing device (a laser lithograph in the exemplary embodiment), a pit 20 is produced. Firstly, the write beam 22 is focused in such a way that it has its smallest cross-section approximately in the absorber layer 14. In this case, the partly transparent reflective layer 18 is of great help, since it deflects the write beam 22 back into the writing device, where the reflection is evaluated. The focusing optics of the write beam 22 are then adjusted until the position of the focus is optimized. In the exemplary embodiment, the focus 23 is in the thin reflective layer 18, which is simplest to achieve. During the focusing operation, the write beam 22 can be operated at lower power, in order to prevent excessive heating in the vicinity of the focus.

The representation of the write beam 22 and its focus 23 in FIG. 4 is very schematic. Because of the wave nature of light, the focus 23 is not shaped like a point but has a size comparable with the diameter of a pit 20, so that the write beam 22 is capable of heating relatively uniformly a region of the size of a pit 20 within the data storage medium 11. The greatest heating in this case occurs within the absorber layer 14, since it is located in the region of the focus 23 and the absorber dye absorbs the write beam 22. The heat liberated in the process is largely transferred through the reflective layer 18 to the polymer film 12 and in this way effects a local change in the refractive index in the polymer film 12 in the region of a pit 20. Since the polymer film 12 is substantially heated in the lower region, the pit 20 does not extend over the full thickness of the polymer film 12. In practice, the transition zone in the upper region of a pit 20 to the central region of the polymer film 12 is continuous, that is to say the refractive index changes gradually in this zone and is not delimited as sharply as indicated in FIG. 4.

The distance between the upper region of a pit 20 and the outer side 13 of the polymer film 12 is relatively large, so that the pits 20 produced by the write beam 22 lie in a region of the polymer film 11 which is relatively safe against external influences.

In order to put information into the polymer film 11, first of all phase information contained in a hologram of a stored object is calculated as a two-dimensional arrangement. This can be carried out as a simulation of a classical structure for producing a photographically recorded hologram, in which coherent line from a laser, after scattering at the stored object, is brought into interference with a coherent reference beam, and the interference pattern produced in the process is recorded as a hologram. The two-dimensional arrangement (two-dimensional array) then contains the information which is necessary to drive the write beam of a laser lithograph. In the exemplary embodiment, the laser lithograph has a resolution of about 50 000 dpi (i.e. about 0.5 μm). The write beam from the laser lithograph is guided over the outer side 13 of the polymer film 12 in pulsed operation (typical pulse duration of about 10 ns to 10 μs with a beam power of about 1 mW to 20 mW in order to put in a pit 20), in order to put the desired information sequentially into the polymer film 12 (or a preselected region of the polymer film 12). In the process, the write beam 22 heats the absorber layer 14 in accordance with the two-dimensional array and in this way produces the pits 20, as explained above.

FIG. 5 illustrates in a schematic way how the information stored in the polymer film 12 can be read out. For this purpose, coherent light from a laser is aimed at the outer side 13 of the data storage medium 11. For clarity, only a small section of this coherent light, preferably incident in parallel, is illustrated in FIG. 5, and is designated 24 (incident read beam). In practice, the coherent light is aimed at the polymer film 12 over a large area and covers a region of, for example, 1 mm². This is because, in order to reconstruct the stored information, the light originating from many pits 20 must be registered. The intensity of the incident read beam 24 is too weak to change the refractive index in the polymer film 12 and thus the stored information.

Part of the incident read beam 24, which, for practical reasons, strikes the outer side 13 of the polymer film 12 at an angle, is reflected at the reflective layer 18 on the underside of the polymer film 12, so that a reflected read beam 26 originates from the reflective layer 18 and, in the process, passes through the pits 20. (The proportion of the incident read beam 24 let through by the reflective layer 18 is not shown in FIG. 5, for clarity). Since the local refractive index of the polymer film 12 is different, depending on the pit 20, the local optical path length is varied, so that phase shifts occur. The consequence of this is that spherical waves 28 originate from the data storage medium 11 in the manner of a diffraction pattern, containing the stored phase information. At some distance from the data storage medium 11, a holographic image, which is produced by interference between the spherical waves 28, can be registered by a detector.

The expenditure required for the detector and further processing of the registered holographic image depend on the type of stored object, as already explained further above. For the reproduction of machine-readable data (data pages), a CCD sensor connected to a data processing device is particularly suitable while, for pure image reproduction, a simpler detector is also expedient, in particular if the image data is not to be processed further.

Using FIG. 6, a further possible way of storing holographic information by means of a holographic data storage medium will be explained, said medium being constructed similarly to the holographic data storage medium according to FIG. 2. The holographic data storage medium designated 31 here again has a polymer film 32 with an outer side 33, an absorber layer 34, an adhesive layer 36 and a reflective layer 38.

Figure 6:
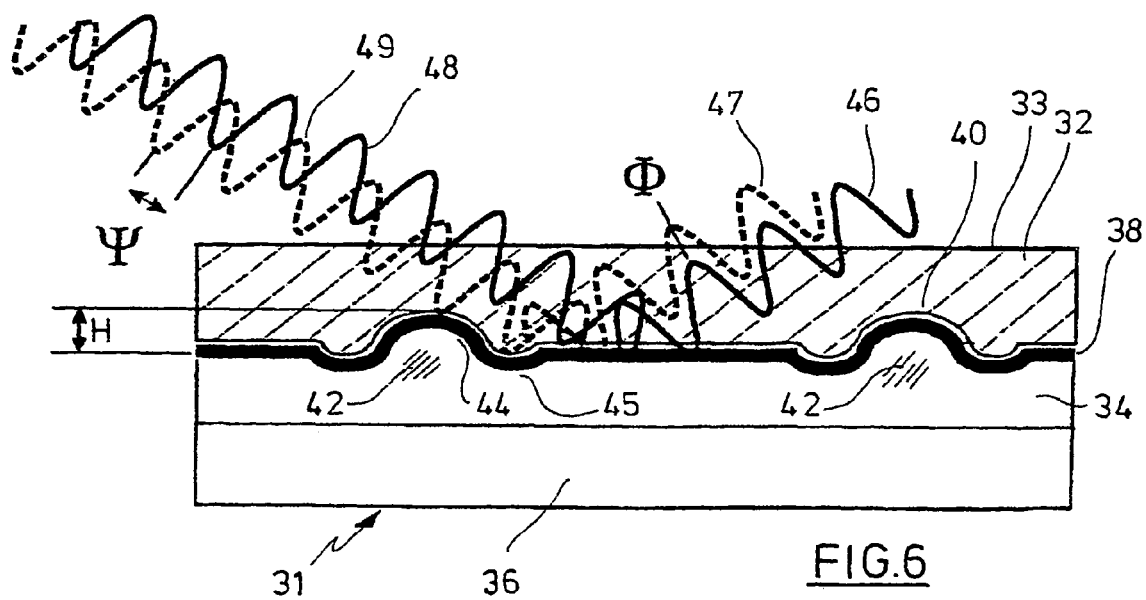
FIG. 6 shows a schematic longitudinal section through a holographic data storage medium according to the second embodiment, in which information can be stored via the local interface structure, the reading of information being illustrated.

In order to produce a pit for storing information, a pulsed write beam from a writing device (preferably a laser lithograph, as explained using FIGS. 3 to 5) is focused via the outer side 33 of the polymer film 32 and through the partly transparent reflective layer 38 onto a zone 42 which, in FIG. 6, is indicated by hatching. At the start of this process, the underside of the polymer film 32 (that is to say the interface to the reflective layer 38) and the reflective layer 38 are still flat. Since the zone 42 is located in the region of the absorber layer 34, the light energy from the write beam is converted efficiently into heat. Because of the poor thermal conductivity of the material, a significant increase in temperature occurs in a closely delimited volume, during which the interface structure of the polymer film 32 is changed locally. In this way, a pit 40 is produced, that is to say the local region in which information is stored. Each pit 40 includes a central depression 44 in the polymer film 32, which is surrounded by a peripheral, more or less annular, thrown-up portion 45. The difference in level between the lowest point of the depression 44 and the highest point of the thrown-up portion 45, that is to say the local maximum height change of the interface structure in the pit 40, is designated H in FIG. 6. H lies typically in the range from 50 nm to 500 nm. The distance between the centers of two adjacent pits 40 is preferably about 1 μm to 2 μm. In the exemplary embodiment, a pit 40 has a diameter of about 0.8 μm. Shapes other than round pits 40 are likewise possible. The typical dimension of a pit is preferably about 0.5 μm to 1.0 μm.

The information can be stored in a pit 40 in binary encoded form, by H assuming only two different values (one of the two values preferably being 0). It is also possible to store information in a pit 40 in continuously encoded form, it being possible for H for a given pit 40 to assume any desired selected value from a predefined value range.

Otherwise, the information can be put into the data storage medium 31 in a manner similar to the data storage medium 11, that is to say preferably with the write beam from a laser lithograph which is guided over the polymer film 32 in pulsed operation and in the process produces the pits 40 in a previously calculated way. In plan view, the polymer film 32 with the pits 40 then appears similar to the illustration in FIG. 3.

FIG. 6 also illustrates, in a schematic way, how the information stored in the data storage medium 31 can be read out. For this purpose, coherent light from a laser (preferably at a wavelength which is not absorbed or absorbed only slightly by the absorber layer 34) is aimed at the outer side 33 of the data storage medium 31. (Alternatively, use can also be made of a very bright LED which, under certain circumstances, even leads to more beneficial results, primarily with regard to a reduction in what is known as speckle noise). For clarity, of this coherent light, which is preferably incident in parallel (incident read beam), only a small detail is illustrated in FIG. 6, namely the incident light waves designated 46 and 47. In practice, the coherent light is aimed at the polymer film 32 over a large area and covers a region of, for example, 1 mm². This is because, in order to reconstruct the stored information, the light originating from many pits 40 must be registered. The intensity of the incident read beam is too weak to change the interface structure of the polymer film 32 and thus the stored information.

The light waves 42 and 43 have a fixed phase $\Phi$ in relation to one another. For practical reasons, they fall on the outer side 33 of the polymer film 32 at an angle, pass through the polymer film 32 and are partly reflected at the reflective layer 38, so that reflected light waves 48 and 49 originate from the reflective layer 38 and in turn pass through the polymer film 32. For clarity, the proportion of the incident light waves 46 and 47 which passes through the partly transparent reflective layer 38 is not illustrated in FIG. 6. Since the local interface structure of the polymer film 32 varies over the pits 40, a phase shift occurs, and the reflected light waves 48 and 49 emerge with a phase $\Psi$, as illustrated in FIG. 6. The consequence of this is that light waves in which phase information is contained originate in many directions from the data storage medium 31 in the manner of a diffraction grating. At some distance from the data storage medium 31, a holographic image, which is brought about by interference between these light waves and constitutes a reconstruction of the stored information, can be registered by a detector.

By using FIGS. 5 and 6, two different possible methods by which a local change in the polymer film 12 or 32 can be used for storing information have been explained. Intermediate forms, that is to say both a change in the refractive index and in the interface structure of the polymer film in a pit, are likewise conceivable.

In principle, the methods explained for putting information in and reading information out can be used even when there is no reflective layer 18 or 38. For example, a write beam can also be focused without the aid of a reflective layer. When information is read out in reflection, a difference in the refractive index between two layers can be used. Furthermore, embodiments of the holographic data storage medium are conceivable in which the data storage medium is transilluminated in transmission when information is read out.

Figure 7:
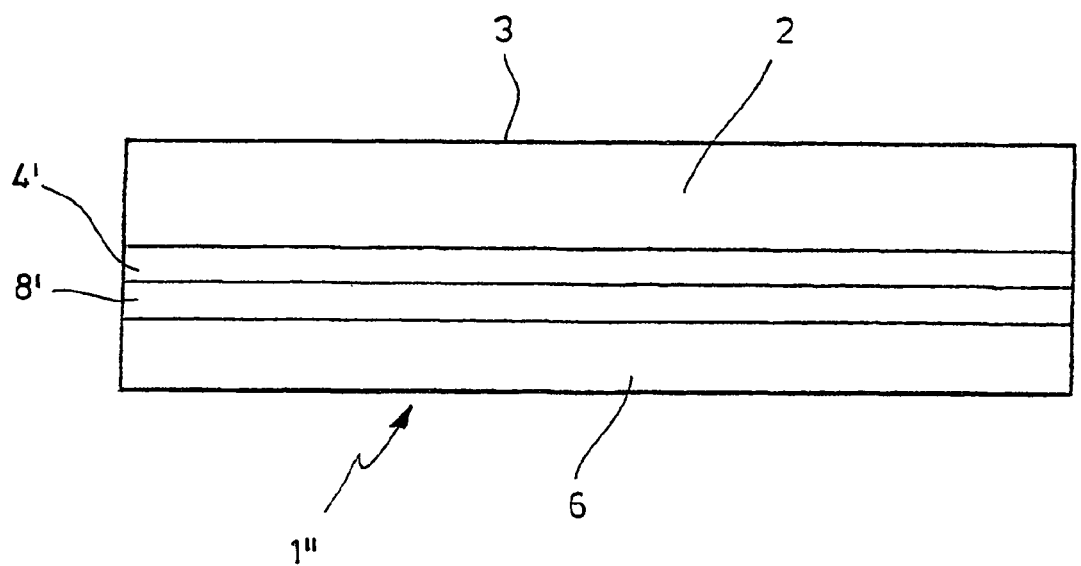
FIG. 7 shows a schematic longitudinal section through a third embodiment of the holographic data storage medium according to the invention.

A third exemplary embodiment of a layer structure of the holographic data storage medium is illustrated in schematic longitudinal section in FIG. 7. The data storage medium designated 1″ contains a polymer film 2 which is used as a storage layer and top layer with an exposed outer side 3. Underneath the polymer film 2 and adjacent thereto is an absorber layer 4′. A reflective layer 8′ is arranged between the absorber layer 4′ and an adhesive layer 6, on the underside (which is covered by a protective layer in the delivered state). In the exemplary embodiment, the reflective layer 8′ consists of aluminum and is so thick that it is opaque and reflects maximally.

In the case of this layer structure, the reflective layer 8′ again makes it easier to focus the write beam onto the absorber layer 4′. Furthermore, when the information put in is read out, the absorber layer 4′ is transilluminated.

If the absorber dye contained in the absorber layer 4′ can be bleached locally when information is put in (for example with the aid of a laser lithograph), a change used for storing information can be achieved not only by the local heating of the absorber dye and the local change in the polymer film 2 effected by this (as explained above), but additionally also by a local change in the optical properties of the absorber dye, namely the absorption capacity. When information is read out from the data storage medium 1″, both effects are used in the layer structure according to FIG. 7, which results in amplification of the contrast of the read signal.

The following Table 1 lists dyes which are in principle suitable as an absorber dye for the absorber layer of the holographic data storage medium. In the first column, the wavelength (in nm) of the absorption maximum is specified; Table 1 is arranged by increasing wavelengths, if wavelengths are present. If available, the color index (CI) and a synonymous designation are also listed.

TABLE 1

Dyes which, in principle, are suitable as absorber dyes

| Wavelength | Name | CI | Synonym |
|---|---|---|---|
| | 2.3.4-Triazapentamethinecyanine | | |
| | Acridinium yellow | | |
| | Alizarin black S | | |
| | Amido yellow E | | |
| | Analinee yellow | | |
| | Analinee black | | |
| | Analinee sulfone phthalein | | |
| | Analinee violet | | |
| | Anthrasol blue IBC | | |
| | Antique purple | | 6.6′-dibromoindigo |
| | Artisil blue GLF | | |
| | Astraphloxin FF | | |
| | Astrazone blue FGGL | CI 11105 | |
| | Astrazone yellow 3 GL | | |
| | Astrazone red G | | |
| | Benzaurin | | |
| | Benzo light yellow 4GL | | |
| | Benzyl orange | | |
| | Bindschedler's Green | | |
| | Brasilein | | |
| | Brilliant indigo 4B | | Ciba blue 2B |
| | Brilliant orange RK | | |
| | Bromophenol blue | | |
| | Bromophenol red | | |
| | Bromothymol blue | | |
| | Bromoxylenol blue | | |
| | Butter yellow | | |
| | Caledon red XB5 | | |
| | Capri blue | | |
| | Capri blue | | |
| | Carbazolindanalinee | | |
| | Carbolan violet 2R | | |
| | Carthamine | | |
| | Celliton fast blue-green B | | |
| | Quinoline blue | | |
| | Chlorantin light green BLL | | |
| | Chlorantin light turquoise blue GLL | | |
| | Chrome violet Gy | | |
| | Cibacetyl violet | | |
| | Cibanon red 4B | | |
| | Cibanon red G | | |
| | Doebner's violet | | |
| | Epsilon blue | | |
| | Fanal colors | | |
| | Fluorenequinone | | |
| | Yellow-orange S | CI 15985 | |
| | Green sensitizer MA2116 | | |
| | Haematein | | |
| | Helindon orange | | |
| | Helindon pink | | |
| | Helio fast yellow 5GK | | |
| | Heliogen green G | | |
| | Hydron blue R | | |

TABLE 1-continued

Dyes which, in principle, are suitable as absorber dyes

| Wave-length | Name | Cl | Synonym |
|---|---|---|---|
| | Hypericin | | |
| | Immedial brilliant blue | | |
| | Immedial yellow GG | | |
| | Immedial pure blue | | |
| | Immedial black | | |
| | Indanthen yellow | | |
| | Indanthren blue GCD | | |
| | Indanthren blue RS | | |
| | Indanthren bordeaux RR | | |
| | Indanthren brilliant blue 4G | | |
| | Indanthren brilliant green FFB | | |
| | Indanthren brilliant orange GR | | |
| | Indanthren brilliant violet 2R | | |
| | Indanthren khaki GG | | |
| | Indanthren orange 2RT | | |
| | Indanthren red-brown 5RF | | |
| | Indanthren red-violet | | |
| | Indanthren turquoise blue 3GK | | |
| | Indanthren violet RRK | | |
| | Indathren yellow 5GK | | |
| | Indigo yellow 3G | | |
| | Indian yellow | | |
| | Indra red | | |
| | Irgalan brown-violet DL | | o.o'-dihydroxy-azo dye |
| | Isoviolanthrone | | |
| | Juglon | | |
| | Madder lakes | | |
| | Lake red | | |
| | Lumogen | | |
| | Mauvein | | |
| | Maxilon red BL | | |
| | Michler's Hydro blue | | |
| | Morin | Cl 75660 | |
| | Muscaflavin | | |
| | Muscarufin | | |
| | Naphthalene green V | | |
| | Neolan blue 2G | | |
| | Nitramine | | |
| | Oil yellow | | 3.2'-dimethyl-4-aminoazobenzene |
| | Oxonine | | |
| | p-Xylenol blue | | |
| | Palanil pink RF | | |
| | Paramethyl red | | |
| | Patent blue | | |
| | Patent blue V | Cl 42501 | |
| | Permanent violet RL | | |
| | Phenylene blue | | |
| | Phthalogen blue IBN | | |
| | Phthalogen blue-black IVM | | |
| | Pinachrome blue | | |
| | Procinyl blue R | | |
| | Pseudocyanine | | |
| | Rubin pigment BK | | |
| | Sambesi black V | | |
| | Acid fuchsine | | |
| | Sulfur black T | | |
| | Supracen blue SES | | |
| | Thioindigo | | Helindon red 2B; Algol red 5B; vat red B |
| | Thionoultra green B | | |
| | Thiopyronine | | |
| | Toluylene blue | | |
| | Vidal black | | |
| | Violanthrone | | |
| 1080 | IR 26 | | |
| 1090 | IR 5 | | |
| 229/345 | Primuline | Cl 49000 | |
| 251 | BM-Terphenyl | | 2,2''-dimethyl-p-terphenyl |
| 266 | TMQ | | 3,3',2'',3'''-tetramethyl-p-quaterphenyl |
| 275 | BMQ | | 2,2'''-dimethyl-p-quaterphenyl |
| 275 | p-Terphenyl | | PTP |
| 285 | DMQ | | 2-methyl-5-t-butyl-p-quaterphenyl |
| 295 | TMI | | 2,5,2'''',5''''-tetramethyl-p-quinquephenyl |
| 297 | p-Quaterphenyl | | PQP |

TABLE 1-continued

Dyes which, in principle, are suitable as absorber dyes

| Wavelength | Name | CI | Synonym |
|---|---|---|---|
| 302 | Butyl-PBD | | 2-(4-biphenylyl)-5-(4-t-butylphenyl)-1,3,4-oxadiazole |
| 302 | PBD | | 2-(4-biphenylyl)-5-phenyl-1,3,4-oxadiazole |
| 303 | PPO | | 2,5-diphenyloxazole |
| 308 | Polyphenyl 1 | | p-quaterphenyl-4,4'''-disulfonic acid disodium salt |
| 308 | Polyphenyl 2 | | p-quaterphenyl-4,4'''-disulfonic acid dipotassium salt |
| 310 | QUI | | 3,5,3'''',5''''-tetra-t-butyl-p-quinquephenyl |
| 313 | BiBuQ | | 4,4'''-bis-(2-butyloctyoxy)-p-quaterphenyl |
| 314 | BBD | | 2,5-bis-(4-biphenylyl)-1,3,4-oxadiazole |
| 320 | TBS | | 3,5,3''''',5'''''-tetra-t-butyl-p-sexiphenyl |
| 324 | PPF | | 2,5-diphenylfuran |
| 327 | PBBO | | 2-(biphenylyl)-6-phenyl-1,3-benzoxazole |
| 330 | Furan 2 | | 2-(4-biphenylyl)-6-phenylbenzoxazotetrasulfonic acid potassium salt |
| 333 | a-NPO | | 2-(1-naphthyl)-5-phenyl-phenyloxazole |
| 340 | BBO | | 2,5-bis-(biphenylyl)-oxazole |
| 340 | DPS | | 4,4'-diphenylstilbene |
| 341 | Direct yellow 62 | CI 36900 | |
| 342 | Fast red violet salt LB | | |
| 347 | 4-Hydroxyazobenzol | CI 11800 | |
| 350 | Bis-MSB | | p-bis(o-methylstyryl)-benzene |
| 350 | Carbostyryl 7 | | 7-amino-4-methylcarbostyryl |
| 350 | Stilbene 1 | | [1,1'-biphenyl]-4-sulfonic acid, 4,4''-1,2-ethene-diylbis-,dipotassium salt |
| 350 | Stilbene 3 | | 2,2'-([1,1'-biphenyl]-4,4'-diyldi-2,1-ethenediyl)-bis-benzenesulfonic acid |
| 352 | Fast red salt PDC | CI 37151 | |
| 354 | Coumarin 120 | | 7-amino-4-methylcoumarin |
| 354 | Cristal violet lactone | | |
| 354 | Mordant yellow 10 | CI 14010 | |
| 355 | Furan 1 | | Benzofuran,2,2'-[1,1'-biphenyl]-4,4'-diyl-bis-tetrasulfonic acid |
| 355 | Quinolone | | 7-dimethylamino-1-methyl-8-azaquinolone-2 |
| 356 | Fast korinth salt Vkz. | CI 37220 | |
| 357 | Celliton fast yellow G | CI 11855 | |
| 357 | Fast red salt ITR | CI 37150 | |
| 358 | POPOP | | 1,4-di[2-(5-phenyloxazolyl)]benzene |
| 359 | Disperse yellow 9 | CI 10375 | N-(2,4-dinitrophenyl)-p-phenylenediamine |
| 360 | Carbostyryl 3 | | 7-dimethylamino-4-methylquinolone-2 |
| 360 | Fast granite salt | CI 37210 | |
| 362 | Alizarin yellow GG | CI 14025 | Mordant yellow 1 |
| 362 | Naphthochrome green | CI 44530 | Mordant green 31 |
| 366 | Coumarin 2 | | 7-amino-4-methylcoumarin |
| 368 | Walk yellow O | CI 25135 | |
| 371 | Fast blue salt B | CI 37235 | |
| 372 | Coumarin 4 | | 7-hydroxy-4-methylcoumarin |
| 372 | Fast red salt RC | CI 37120 | |
| 373 | Coumarin 47 | | 7-diethylamino-4-methylcoumarin |
| 373/487 | Mordant brown 1 | CI 20110 | |
| 374 | Thioflavin S | CI 49010 | Direct yellow |
| 375 | Fast red salt B Tetrafluoroborate salt | CI 37125 | |
| 377 | Variamine blue salt RT | CI 37240 | |
| 378 | Thiazolyl blue | | 3-(4,5-dimethyl-2-thiazolyl)-2,5-diphenyltetrazoliumbromide |
| 380 | 1-Methoxyanthraquinone | CI 37325 | |
| 380 | Coumarin 466 | | 7-diethylaminocoumarin |
| 380 | Mordant yellow 12 | CI 14045 | |
| 382 | Coumarin 151 | | 7-amino-4-trifluormethylcoumarin |
| 382 | Fast blue | | Diamidino 253/50 |
| 385 | Alizarin yellow R | CI 14030 | Mordant orange1, 5-(p-nitrobenzolazo)-salicylic acid |
| 385 | Celliton fast yellow 5R | CI 26090 | 7,4'-benzolazo-4-hydroxy-3-methylazobenzene |
| 385 | Pinacryptol yellow | | |
| 386 | Mordant orange 10 | CI 26560 | |
| 388 | Sudan orange G | CI 11920 | 2,4-dihydroxyazobenzene |
| 389 | Chrysophenin | CI 24895 | Direct yellow 12 |
| 389 | Coumarin 102 | | 2,3,5,6-1H,4H-tetrahydro-8-methylquinolizino-[9,9a,1-gh]-coumarin |
| 390 | Direct yellow 50 | CI 29025 | Siriuslichtgebret |
| 390 | Direct yellow 8 | CI 13920 | |
| 392 | Supramine yellow R | CI 18835 | Acid yellow 25 |
| 393 | Direct yellow 27 | CI 13950 | |
| 393 | Acid yellow 76 | CI 18850 | Polar yellow 2G |

TABLE 1-continued

Dyes which, in principle, are suitable as absorber dyes

| Wavelength | Name | CI | Synonym |
|---|---|---|---|
| 394 | Naphthol AS | CI 37505 | 2-hydroxy-3-naphthanilide |
| 395 | Coumarin 307 | | 7-ethylamino-6-methyl-4-trifluoromethylcoumarin |
| 395 | Coumarin 500 | | 7-ethylamino-4-trifluoromethylcoumarin |
| 395 | Fast blue salt BB | CI 37175 | |
| 396 | Coumarin 6H | | 2,3,5,6-1H,4H-tetrahydroquinolzino-[9,9a,1-gh]coumarin |
| 397 | Brilliant yellow | CI 24890 | |
| 397 | Coumarin 152 | | 7-dimethylamino-4-trifluormethylcoumarin |
| 400 | Mesoporphyrin-IX-dimethyl ester | | 7,12-diethyl-3,8,13,17-tetramethyl-21H,23H-porphin-2,18-dipropionic acid dimethyl ester |
| 400 | Mordant brown 24 | CI 11880 | 3-(3,5-dinitro-2-hydroxy-benzolazo)-2-hydroxy-5-methylacetanilide |
| 400 | Acid yellow 17 | CI 18965 | |
| 401 | Mesoporphyrin-IX- dihydrochloride | | 7,12-diethyl-3,8,13,17-tetramethyl-21H,23H-porphin-2,18-dipropionic acid |
| 402 | Thiazol yellow G | CI 19540 | Titanium yellow |
| 403 | Pyranin | CI 59040 | 8-hydroxypyren-1,3,6-trisulfonic acid trisodium salt |
| 404 | Cibachron brilliant yellow 3G-P | CI 18972 | Reactive yellow |
| 405 | 1-Hydroxyanthraquinone | | |
| 405 | Coumarin 152A | | 7-diethylamino-4-trifluoromethylcoumarin |
| 407 | Flavazin L | CI 18820 | |
| 407 | Supramine yellow 3GL | CI 18900 | Acid yellow 29 |
| 408 | Fast light yellow D3GA | CI 18890 | Acid yellow 34 |
| 410 | Coumarin 522 | | N-methyl-4-trifluoromethylpiperidino-[3,2-g]-coumarin |
| 410 | Methyl red | CI 13020 | 4'-(dimethylamino)-azobenzol-2-carbolic acid |
| 410 | Sulfon yellow R | CI 22910 | Acid yellow 42 |
| 412 | Quinoline yellow S | CI 47005 | |
| 412 | Coumarin 30 | | 3-(2'-N-methylbenzimidazolyl)-7-N,N-diethylaminocoumarin |
| 412 | Acid yellow 40 | CI 18950 | |
| 412 | Thioflavin TCN | CI 49005 | 3,6-dimethyl-2-(4-dimethylaminophenyl)-benzothiazoliumchloride |
| 413 | Mordant red 19 | CI 18735 | 5-chloro-2-hydroxy-3-(5-hydroxy-3-methyl-1-phenyl-4-pyrazlolylazo)-benzosulfonic acid sodium salt |
| 414 | Fast silk yellow G | CI 14170 | Acid yellow 65 |
| 414 | Metanil yellow | CI 13065 | Tropaeolin |
| 419 | Bromocresol purple | | 5',5''-dibromo-0-cresolsulfonphthalein |
| 422 | Brilliant sulfaflavin | | |
| 422 | Bromophenol blue | | 3',3'',5',5''tetrabromophenolsulfonphthalein |
| 423 | Bromocresol green | | 3',3'',5',5''-tetrabromo-m-cresolsulfonphthalein |
| 423 | Coumarin 153 | | 2,3,5,6-1H,4H-tetrahydro-8-trifluoromethylquinolizino-[9,9a,1-gh]coumarin |
| 423 | Phenol red sodium salt | | |
| 424 | 3,3'-Diethyl-thiacyaniniodide | | |
| 424 | Acid orange 63 | CI 22870 | |
| 425 | Coumarin 510 | | 2,3,5,6-1H,4H-tetrahydro-9-(3-pyridil)-quinolizino-[9,9a,1-gh]coumarin |
| 425 | Tartrazin | CI 19140 | |
| 427 | Disperse orange 13 | CI 26080 | 1-benzolazo-4-(4-hydroxybenzolazo)-naphthalene |
| 427/452 | Safran | CI 75100 | Saffron, Crocus |
| 428/392 | Citronin A | CI 10316 | Naphthol yellow S; 2,4-dinitro-1-naphthol-7-sulfonic acid disodium salt |
| 430 | Curcumin | CI 75300 | Diferuloylmethane |
| 430 | Martius yellow | | 2,4-dinitro-1-naphthol |
| 433 | Coumarin 7 | | 3-(2'-benzamidazylyl)-7-N,N-diethylaminocoumarin |
| 434/370 | Auramine O | CI 41000 | 4,4'-(imidocarbonyl)-bis-(N,N-dimethylanaline) hydrochloride |
| 436 | Coumarin 314 | | 2,3,5,6-1H,4H-Tetrahydro-9-carboethoxyquinolizino-[9,9a,1-gh]coumarin |
| 439 | Quinoline yellow A | CI 47000 | Quinophthalone |
| 440 | Fluorol 7GA | | |
| 440 | Naphthyl red hydrochloride | | 4-benzolazo-1-naphthylamine hydrochloride |
| 440 | Palatin fast yellow BLN | CI 19010 | Acid yellow 54 |
| 442 | Acridine yellow | CI 46025 | 3,6-diamino-2,7-dimethylacridine hydrochloride |
| 442 | Mordant brown 33 | CI 13250 | |
| 443 | Celliton fast orange GR | CI 11005 | 4-amino-4'-nitroazobenzene |
| 445 | Acid yellow 99 | CI 13900 | |
| 446 | Supranol brown 4R | CI 26550 | Acid orange 51 |
| 449 | Chrysoidine G | CI 11270 | |

TABLE 1-continued

Dyes which, in principle, are suitable as absorber dyes

| Wavelength | Name | CI | Synonym |
|---|---|---|---|
| 450 | 4',5'-Dibromofluorescein | Cl 45370 | |
| 450 | Coumarin 334 | | 2,3,5,6-1H,4H-tetrahydro-9-acetylquinolizino-[9,9a,1-gh]-coumarin |
| 451 | Oleobrown RR | Cl 11285 | |
| 452 | 2-hydroxy-1,4-naphthoquinone | Cl 75480 | Lawson |
| 455 | Acid orange 74 | Cl 18745 | |
| 457 | Disperse orange 25 | | |
| 457 | Fast black salt | Cl 37190 | |
| 458 | Chromazurol S | Cl 43825 | Mordant blue 29 |
| 458 | Coumarin 6 | | 3-(2'-benzothiazolyl)-7-diethylaminocoumarin |
| 462 | Trypaflavin | | Acriflavin |
| 465 | 1-Aminoanthraquinone | | |
| 468 | Bismarck brown R | Cl 21010 | Vesuvin R |
| 472 | DASPI | | 2-(p-dimethylaminostyryl)pyridylmethyl iodide |
| 472 | DCM | | 4-dicyanmethylene-2-methyl-6-(p-dimethylaminostyryl)-4H-pyran |
| 475 | Orange G | Cl 16230 | Acid orange 10 |
| 476/418 | Sudan I | Cl 12055 | Sudan yellow |
| 480 | 1,5-Diaminoanthraquinone | | |
| 480 | Pyridine 1 | | 1-ethyl-2-(4-(p-dimethylaminophenyl)-1,3-butandienyl)pyridinium perchlorate |
| 482 | Aurin | Cl 43800 | 4-[bis-(4-hydroxyphenyl)methylene]-2,5-cyclohexadien-1-one |
| 482 | Crocein orange G | Cl 15970 | Ponceau 4 GB; 5-benzolazo-6-naphthol-2-sulfonic acid sodium salt |
| 483 | Celliton fast orange 5R | Cl 11080 | 4-analineo-4'-nitroazobenzene |
| 483 | Orange II | Cl 15510 | Acid orange A; 4-(2-hydroxy-1-naphthalinazo)-benzenesulfonic acid sodium salt |
| 485 | DOCI | | 3,3'-diethyloxacarbocyanine iodide |
| 486 | Celliton orange R | Cl 60700 | 1-amino-2-methyl-anthraquinone |
| 489 | Fast yellow ex. | Cl 13015 | Acid yellow-R; 4-aminoazobenzol-3,4'-disulfonic acid sodium salt |
| 490 | Astrazone orange G | Cl 48035 | |
| 490 | Orange ROF | Cl 15575 | Acid orange 8 |
| 490 | Resorcin yellow | Cl 14270 | Tropaeolin O; 2,4-dihydroxy-azobenzol-4'-sulfonic acid sodium salt |
| 491 | Fast granite GBC Base | Cl 11160 | 4-amino-2',3-dimethylazobenzol |
| 492 | Acridine orange | Cl 46005 | 3,6-bis-(dimethylamino)-acridin hydrochloride hydrate |
| 492 | Mordant brown 48 | Cl 11300 | 2-(5-chlor-2,4-diaminobenzeneazo)-4,6-dinitrobenzene |
| 493/420 | Sudan II | Cl 12140 | Sudan orange, Oleo scarlet G; 1-(2,4-dimethylbenzolazo)-2-naphthol |
| 494 | Pyrromethene 546 | | 4,4'-difluoro-1,3,5,7,8-pentamethyl-4-bor-3a,4a-diaza-s-indacene |
| 494 | Acid red 183 | Cl 18800 | |
| 494/388 | Remazole brilliant orange 3 R | Cl 17757 | Reactive orange 16 |
| 495 | Disperse red 19 | Cl 11130 | 4-[bis-(2-hydroxyethyl)-amino]-4'-nitroazobenzene |
| 496 | Fluorescein | Cl 45350 | |
| 497 | Congo red | Cl 22120 | 4,4'-bis-(4-amino-sulfo-3-naphthylazo)biphenyl disodium salt |
| 498 | Pyrromethene 556 | | Disodium-1,3,5,7,8-pentamethylpyrromethene-2,6-disulfonate-difluoroborate complex |
| 498 | Acid anthracene red G | Cl 22890 | Acid red 97 |
| 500 | Fast scarlet | Cl 23500 | Saffrosin, benzopurpurin 4B |
| 500 | Pyridine 2 | | 1-ethyl-4-(4-(p-dimethylaminophenyl)-1,3-butanedienyl)pyridinium perchloratee |
| 500 | Uranine | | Disodium fluorescein |
| 500/374 | Mordant brown 4 | Cl 11335 | 2-(2,4-diamino-5-methyl-benzolazo)-4,6-dinitrophenol |
| 501 | Rhodamine 123 hydrate | | |
| 501 | Acid alizarin violet N | Cl 15670 | Mordant violet 5; Pontachrome violet SW |
| 502 | Celliton scarlet B | Cl 11110 | Dispersions red 1 |
| 503 | Celliton fast ruby B | Cl 11115 | Dispersions red 13 |
| 503 | Mordant black 11 | Cl 14645 | Eriochrome black T |
| 503/388 | Ponceau R | Cl 16150 | Xylidin-Ponceau 2R |
| 504 | Allura red AC | Cl 16035 | |
| 505 | | Cl 12100 | Solvent orange 2 |
| 505 | Fast red A | Cl 15620 | Roccellin, Acid red 88; 2'-hydroxy-(1,1')-azonaphthalene-4-sulfonic acid sodium salt |
| 505 | Ponceau BS | Cl 26905 | Biebrich scarlet |
| 506/350 | Cochineal red | Cl 16255 | Neucoccin, Brilliant scarlet 4R,Scarlet N, Victoria scarlet 4R |

TABLE 1-continued

Dyes which, in principle, are suitable as absorber dyes

| Wavelength | Name | CI | Synonym |
|---|---|---|---|
| 507 | Benzo fast scarlet 4BS | Cl 29160 | Direct red 23 |
| 507 | Mercurochrome | | |
| 507 | Methyl orange | Cl 13025 | |
| 507/354 | Sudan III | Cl 26100 | |
| 507/398 | Toluidine red | Cl 12120 | |
| 508 | 1-Methylaminoanthraquinone | | |
| 508/376 | Fast acid red E | Cl 14710 | Acid red 4 |
| 508/397 | Direct red 81 | Cl 28160 | Chlorantin light red-5BL |
| 508/532 | Cochineal scarlet PS | Cl 14900 | Acid red 8 |
| 510 | Brilliant crocein MOO | Cl 27290 | Cotton scarlet; acid red 73 |
| 510 | Cristal ponceau | Cl 16250 | |
| 510 | Rhodamine 110 | | o-(6-amino-3-imino-3H-xanthene-9-yl)-benzoic acid |
| 510/530 | Chromotrop 2R | Cl 16570 | Acid red 29 |
| 512 | Chromoxancyanine R | Cl 43820 | Mordant blue 3 |
| 512 | Fluorescein 27 | | 9-(o-carboxyphenyl)-2,7-dichloro-6-hydroxy-3H-xanthen-3-one |
| 512/356 | Fabric scarlet | Cl 26900 | Acid red 151 |
| 514 | Chromotrop 2B | Cl 16575 | |
| 514/351 | Ponceau SS | Cl 27190 | Fabric red G, Wool red B |
| 514/365 | Supranol red PBX | Cl 23635 | Acid red 114 |
| 514/395 | Eosin B | Cl 45400 | Eosin scarlet |
| 515/383 | Azo rubine | Cl 14720 | Mordant blue 79; Chromotrope FB |
| 515/521 | Purpurin | Cl 58205 | Smoke brown G, madder purple |
| 516 | Azocarmin BX | Cl 50090 | Acid red 103 |
| 516 | Mordant blue 9 | Cl 14855 | |
| 517 | Cibachron brilliant red 3B-A | Cl 18105 | Reactive red |
| 517 | Eosin light blue. | | |
| 517 | Eosin light yellow | Cl 45380 | |
| 518 | Fast red B | Cl 16180 | Bordeaux R |
| 518 | Helio fast ruby BBL | Cl 60760 | |
| 518 | Pyrromethene 567 | | 4,4-difluoro-2,6-diethyl-1,3,5,7,8-pentamethyl-4-bora-3a,4a-diaza-s-indacene |
| 518/359 | Oil red O | Cl 26125 | Solvent red 27 |
| 519 | Phenosafranin | Cl 50200 | Safranin B extra |
| 519 | Pyrromethene 580 | | 4,4-difluoro-2,6-di-n-butyl-1,3,5,7,8-pentamethyl-4-bora-3a,4a-diaza-s-indacene |
| 520 | 1-Hydroxy-4-aminoanthraquinone | | |
| 520 | Amidonaphthol red 6B | Cl 18055 | |
| 520 | Methyl eosin | Cl 45385 | |
| 520/352 | Ponceau S | Cl 27195 | |
| 520/357 | Sudan IV | Cl 26105 | (Biebrich) scarlet red |
| 521 | Amaranth | Cl 16185 | Azo rubine S, fast red D |
| 521 | Fast red D | | Azo rubine S |
| 521 | Emodine | | |
| 521 | Oil red EGN | Cl 26120 | Solvent red 26 |
| 521 | Sudan red B | Cl 26110 | |
| 522 | Diiodofluorescein | Cl 45425 | |
| 522 | Eosin B alcohol soluble | Cl 45400 | |
| 522 | Sirius pink BB | Cl 25380 | Direct red 75, benzo fast pink 2BL |
| 524 | 1,1'-diethyl-2,2'-cyanine iodide | | |
| 524 | Pyrromethene 597 | | 4,4-difluoro-2,6-di-t-butyl-1,3,5,7,8-pentamethyl-4-bora-3a,4a-diaza-s-indacene |
| 524 | Rhodamine 6G | Cl 45160 | Benzoic acid, 2-[6-(ethylamino)-3-(ethylimino)-2,7-dimethyl-3H-xanthen-9-yl]ethyl ester, monohydrochloride |
| 525 | Erythrosin B | Cl 45430 | |
| 525 | Mordant violet | Cl 43810 | Eriochromcyanin RC |
| 525 | Murexide | | |
| 527 | Lanafuchsine 6B | Cl 18125 | Acid violet |
| 527 | Mordant blue 13 | Cl 16680 | Eriochrome blue SE |
| 528 | Quinaldine red | | |
| 528 | Direct red 80 | Cl 35780 | Sirius red F3B |
| 528 | Mordant black 3 | Cl 14640 | Eriochrome blue black B |
| 528 | Rhodamine 19 | | Benzoic acid, 2-[6-(ethylamino)-3-(etnylimino)-2,7-dimethyl-3H-xanthen-9-yl], perchloratee |
| 529 | Fast acid violet ARR | Cl 45190 | Eriofuchsin A2R |
| 529 | SulfoRhodamine G | Cl 45220 | |
| 530 | DASBTI | | 2-(p-dimethylaminostyryl)-benzothiazolylethyl iodide |
| 530 | Safranin T | Cl 50240 | Safranine O |
| 531/563 | Carmin acid | Cl 75470 | Carmine |
| 532 | Eosin alcohol soluble | Cl 45386 | Ethyl eosin |
| 532/506 | Amidonaphthol red G | Cl 18050 | Acid red 1, azophloxin |

TABLE 1-continued

Dyes which, in principle, are suitable as absorber dyes

| Wavelength | Name | CI | Synonym |
|---|---|---|---|
| 533/364 | Sudan red 7B | Cl 26050 | Oleored blueish |
| 538 | Procion red MX-5B | | Reactive red 2 |
| 540 | DMETCI | | 3,3'-dimethyl-9-ethylthiacarbocyanine iodide |
| 540 | Neutral red | Cl 50040 | |
| 543 | Rhodamine B | Cl 45170 | |
| 544 | Fuchsin S | Cl 42685 | |
| 544 | Para rosanalinee | | Parafuchsin base |
| 545 | Formyl violet S4B | Cl 42650 | Acid violet 4B |
| 545 | Parafuchsin acetate | Cl 42500 | Para rosanalinee acetate |
| 547 | Bismarck brown Y | Cl 21000 | Vesuvin |
| 548 | Alizarin blue black B | Cl 63615 | |
| 548 | Pyronin Y | Cl 45005 | |
| 548/510 | Eosin 10 B | Cl 45410 | Cyanosin, Phloxin B |
| 549 | Bengal pink disodium salt | Cl 45440 | Acid red 94 |
| 549 | Brilliant benzo fast violet | Cl 27905 | Sirius violet BB; direct violet 51 |
| 550 | 1,4-Diaminoanthraquinone | | |
| 550 | Phenoxazone 9 | | 9-diethylamino-5H-benzo(a)phenoxazin-5-one |
| 550 | Pyridine 4 | | 1-ethyl-4-(4-(9-(2,3,6,7-tetrahydro-1H,5H-benzo(i,j)-quinolizinium))-1,3-butadienyl)pyridinium perchlorate |
| 552/374 | Phenolphthalein | | |
| 552/630 | Rhodanil blue | | |
| 553 | New fuchsin 90 Plv. | Cl 42520 | New magenta, Magenta III |
| 553 | Nil red | | |
| 553 | Pyronin B | Cl 45010 | |
| 554 | SulfoRhodamine B | Cl 45100 | Xylylene red B |
| 556/596 | Alzarin red S hydrate | Cl 58005 | |
| 557 | DTCI | | 3,3'-diethylthiacarbocyanine iodide |
| 557/360 | Phenol red | | |
| 558 | Ethyl red | | 1,1'-diethyl-2,4'-cyanine iodide |
| 560 | 3,3'-Diethyl-thiacarbocyanine iodide | | |
| 565 | Nigrosin alcohol soluble | Cl 50415 | |
| 566 | Sulfoncyanine 5R ex. | Cl 26360 | Acid blue 113 |
| 567/629 | Sulfonazo III | | |
| 569 | Palatinchrome black 6BN | Cl 15705 | Mordant black 17 |
| 570 | New fast blue 3R | Cl 51175 | Meldola's blue |
| 570 | Nigrosine water soluble. | Cl 50420 | |
| 570 | Styryl 8 | | 2-(4-(p-dimethylaminophenyl)-1,3-butadienyl)-3-ethylbenzothoazolium perchlorate |
| 570/367 | Cresol red | | |
| 570/407 | Brilliant black BN | Cl 28440 | |
| 571 | Sulfonic acid blue R | Cl 13390 | Anazolene sodium, acid blue 92 FG |
| 572 | Chlorophenol red | | |
| 572 | Sulfoncyanine black BB | Cl 26370 | |
| 574 | Sulfoncyanine GR ex. | Cl 26400 | Acid blue 120 |
| 575 | Litmus | | |
| 575 | Styryl 11 | | 1-ethyl-4-(4-(p-dimethylaminophenyl)-1,3-butadienyl)-quinolinium perchloratee |
| 576 | Rhodamine 101 | | |
| 576 | SulfoRhodamine 101 hydrate | | |
| 579 | Orcein | | Natural red 28 |
| 579/371 | Cresol purple | | |
| 580 | Methylene violet | Cl 52041 | |
| 582 | DODCI | | 3,3'-diethyloxadicarbocyanine iodide |
| 584 | Janus black | | Diazin black |
| 584 | Methyl violet 2B | Cl 42535 | |
| 585 | Brilliant blue R | Cl 42660 | Brilliant indocyanine 6B |
| 585 | Styryl 9M | | 2-(6-(4-dimethylaminophenyl)-2,4-neopentylene-1,3,5-hexatrienyl)-3-methyl-benzothiazolium perchloratee |
| 585/379 | Bromocresol purple sodium salt | | |
| 586 | Nitrazine yellow | Cl 14890 | |
| 588 | Styryl 14 | | |
| 589 | Janus blue | Cl 12210 | |
| 590 | Crystal violet | Cl 42555 | |
| 590 | Pyrromethene 650 | | 4,4-difluoro-8-cyano-1,2,3,5,6,7-hexamethyl-4-bora-3a,4a-diaza-s-indacene |
| 590 | Resorcinol crystal violet | | |
| 592 | DQOCI | | 1,3'-diethyl-4,2'-quinolyloxacarbocyanine iodide |
| 592 | Remazol Brilliant blue R | Cl 61200 | Reactive blue 19 |
| 592 | Victoria blue B | Cl 44045 | Corn blue B |
| 592/396 | Thymolphthalein | | |
| 594 | Benzo light blue FFL | Cl 34140 | |
| 594/376 | Thymol blue | | |

TABLE 1-continued

Dyes which, in principle, are suitable as absorber dyes

| Wavelength | Name | CI | Synonym |
|---|---|---|---|
| 595 | Alizarinsaphirol B | Cl 63010 | |
| 595 | Procion blue MX-R | Cl 61205 | Reactive blue 4 |
| 596 | Ethyl violet | Cl 42600 | |
| 596 | Cresyl violet acetate | | |
| 597 | Remazole black B | Cl 20505 | Reactive black 5 |
| 598 | Thionin acetate | Cl 52000 | Lauth's violet |
| 598/415 | Sudan black B | Cl 26150 | Grease black |
| 599/374 | Alizarin direct blue AR | Cl 62130 | |
| 600 | Alizarinsaphirol A | Cl 62055 | |
| 600 | Oxonol 595 | | |
| 601 | Gallocyanin | Cl 51030 | |
| 602 | Indigo | | |
| 602 | Indigotin | Cl 73000 | |
| 602 | Cresyl violet perchlorate | | 5,9-diaminobenzo[a]phenoxazonium perchloratee |
| 602 | Acid blue 29 | Cl 20460 | |
| 603 | Alkali blue 6B/Nicholson blue | Cl 42750 | |
| 604/560 | Quinaldin blue | | 1,1'-Diethyl-2,2'-carbocyanine chloride |
| 605 | 2,6-Dichlorophenolindophenol | | Tillmann's reagent |
| 605 | Analinee blue | | |
| 605/388 | Tetrabromophenol blue | | |
| 605/642 | Acid green 27 | Cl 61580 | |
| 606 | Astra blue base 6 GLL | | |
| 606 | Astrazone blue GLL | | |
| 606 | DCI-2 | | 1,1'-diethyl-2,2'-carbocyanine iodide |
| 607 | Celliton blue ex | Cl 64500 | 1,4,5,8-Tetraaminoanthraquinone |
| 607 | Pinacyanolbromide | | 1,1'-diethyl-2,2'-carbocyanine bromide |
| 607 | Procion blue HB | Cl 61211 | Reactive blue 2 |
| 607 | Trypan blue | Cl 23850 | Niagara blue 3B, Diamine blue 3B |
| 608 | Indigocarmine | Cl 73015 | |
| 608 | Phenol blue | | |
| 609/567 | Alizarin | Cl 58000 | 1,2-dihydroxyanthraquinone |
| 610 | 1,4,5,8-tetraaminoanthraquinone | | |
| 610/380 | Alizarin direct blue A2G | Cl 62125 | |
| 611 | Evans blue | Cl 23860 | |
| 612/400 | Bromocresol green sodium salt | | |
| 614 | Pinacyanol | | 1,1'-diethyl-2,2'-carbocyanine iodide |
| 615 | Alcian blue 8 GX | Cl 74240 | |
| 615 | Lissamine blue FFN | Cl 42135 | Xylolcyanol FF |
| 615 | Oxazine 4 | | 3-ethylamino-7-ethylimino-2,8-dimethylphenoxazin-5-ium perchlorate |
| 615 | Stenacril blue RL | Cl 11075 | |
| 615 | Styryl 6 | | 2-(4-(p-dimethylaminophenyl)-1,3-butadienyl)-1,3,3-trimethyl-3H-indolium perchloratee |
| 615 | Victoria blue R | Cl 44040 | |
| 615/425 | Malachite green | Cl 42000 | |
| 616 | Azure C | Cl 52002 | |
| 618 | Amido black 10B | Cl 20470 | Naphthol blue black 6B |
| 618 | Chicago blue 6B | Cl 24410 | Diamine pure blue FF |
| 618 | Guinea green B | Cl 42085 | |
| 619 | Victoria pure blue BO | Cl 42595 | |
| 620 | 1,4-dianalineoanthraquinone | | |
| 622 | Brilliant cresyl blue ALD | Cl 51010 | |
| 622/427 | Fast green FCF | Cl 42053 | |
| 625/406 | Erioglaucin disodium salt | Cl 42090 | Alphazurin FG |
| 625/428 | Brilliant green | Cl 42040 | Malachite green |
| 626 | Toluidine blue O | Cl 52040 | Tolonium chloride |
| 627 | Oxazine 170 | | 9-ethylamino-5-ethylimino-10-methyl-5H-benzo(a)phen oxazonium perchloratee |
| 627/582 | Alizarin pure blue R | Cl 61585 | |
| 628 | Nil blue A perchloratee | | 5-amino-9-diethyliminobenzo[a]phenoxazonium perchlorate |
| 629 | Alizarin brilliant blue RFF | Cl 62058 | |
| 629 | DQTCI | | 1,3'-diethyl-4,2'-quinolylthiacarbocanine iodide |
| 630 | Oxonol blue | | |
| 630/422 | Light green SF yellowish | Cl 42095 | Acid green 5 |
| 630/591 | New methylene blue N | Cl 52030 | |
| 633 | Azure A | Cl 52005 | |
| 633 | Wool green | Cl 44090 | Lissamine green BN |
| 635/410 | Patent blue VF | Cl 42045 | |
| 635/420 | Methyl green | Cl 42590 | |
| 637/409 | Patent blue A | Cl 42080 | Alphazurin A |
| 638 | Azure B Thiocyanate | | |
| 638 | Nil blue BX | Cl 51180 | Nil blue chloride |
| 639 | HIDCI | | 1,1',3,3,3',3'-hexamethylindocarbocyanin iodide |

TABLE 1-continued

Dyes which, in principle, are suitable as absorber dyes

| Wavelength | Name | CI | Synonym |
|---|---|---|---|
| 640/594 | Celliton fast blue FFR | CI 61505 | |
| 640/595 | Sudan blue | CI 61552 | Calco oil blue N |
| 642 | Coelestin blue B | CI 51050 | Mordant blue 14 |
| 642/608 | Alizarincyanine green G extra | CI 61570 | |
| 643 | Rhodamine 700 | | |
| 644/595 | Celliton fast blue B | CI 61500 | 1,4-bis-(methylamino)anthraquinone |
| 644/596 | Oil blue N | CI 61555 | Solvent blue 14 |
| 644/607 | Alizarincyanine green oleosoluble | CI 61565 | |
| 645 | Styryl 20 | | |
| 645/522 | Eosin-methylene blue | | May-greenwood-dye |
| 646 | Oxazine 1 | | 3-diethylamino-7-diethyliminophenoxazonium perchloratee |
| 648 | Styryl 15 | | |
| 652/604 | Sudan blue II | CI 61554 | Grease blue B, solvent blue 35 |
| 653 | DTDCI | | 3-diethylthiadicarbocyanine |
| 654 | Rhodulin pure blue 3G | CI 51004 | Zapon fast blue 3G |
| 655 | Carbazine 122 | | |
| 655 | Dithiazanine iodide | | 3,3'-diethyl-thiadicarbocyanine iodide |
| 657 | Azure II | CI 52010 | |
| 657/618 | Methylene green | CI 52020 | |
| 660 | Chlorophyll a | CI 75810 | |
| 660/395 | Janus green B | CI 11050 | Diazine green |
| 663 | Acid black 48 | CI 65005 | |
| 665 | Methylene blue | CI 52015 | |
| 667 | Oxazine 750 | | |
| 675 | Cibachron turquoise blue GF-P | CI 74459 | Reactive blue |
| 682 | Methyl-DOTCI | | 3,3'-dimethyloxatricarbocyanine iodide |
| 682 | Rhodaminee 800 | | |
| 694 | Copper phthalocyanine | CI 74160 | Heliogen blue B; Monastral blue B |
| 707 | 1,1'-diethyl-2,2'-dicarbocyanine iodide | | |
| 710 | DDI | | 1,1'-diethyl-2,2'-dicarbocyanine iodide |
| 714 | Naphthol green B | CI 10020 | |
| 741 | HITCI | | 1,1',3,3,3',3'-hexamethylindotricarbocyanine . iodide |
| 743 | 1,1'-diethyl-2,2'-quinotricarbocyanine iodide | | |
| 750 | IR 144 | | |
| 760 | 3,3'-diethyl-thiatricarbocyanine perchlorate | | |
| 760 | DTTCI | | 3,3'-diethylthiatricarbocyanine iodide |
| 765 | 3,3'-diethyl-thiatricarbocyanine iodide | | |
| 765 | DNTTCI | | 3,3'-diethyl-9,11-neopentylenethiatricarbocyanine iodide |
| 780 | HDITCI | | 1,1',3,3,3',3'-hexamethyl-4,4',5,5'-dibenzo-2,2'-indotricarbocyanine iodide |
| 795 | IR 125 | | |
| 798 | DDTTCII | | 3,3'-diethyl-4,4',5,5'-dibenzothiatricarbocyanine iodide |
| 810 | IR 140 | | |
| 814 | 1,1'-diethyl-4,4'-dicarbocyanine iodide | | |
| 815 | DDCI-4 | | 1,2'-diethyl-4,4'-dicarbocyanine iodide |
| 830 | IR 132 | | |

What is claimed is:

1. A holographic data storage medium, comprising a self-supporting polymer film which is set up as a storage layer, which can be changed locally by heating and which is set up as a top layer of the data storage medium, and comprising an absorber layer which is arranged underneath the polymer film and has an absorber dye which is set up to at least partly absorb a write beam serving to write information and to discharge the heat produced by absorbing the write beam at least partly locally to the polymer film, wherein the holographic data storage medium further comprises a partly transparent reflective layer arranged between the storage layer and the absorber layer.

2. The holographic data storage medium as claimed in claim 1, further comprising an adhesive layer arranged underneath the absorber layer.

3. The holographic data storage medium as claimed in claim 1, wherein the reflective layer has a thickness in the range from 1 nm to 50 nm.

4. The holographic data storage medium as claimed in claim 1, wherein the reflective layer comprises aluminum.

5. The holographic data storage medium as claimed in claim 1, wherein the self-supporting polymer film is oriented.

6. The holographic data storage medium as claimed in claim 5 wherein the self-supporting polymer film is biaxially oriented.

7. The holographic data storage medium as claimed in claim 1, wherein the self-supporting polymer film comprises a material which is selected from the following group:

polypropylene, polyvinylchloride, polyester, polyethylene terephthalate, polyethylene naphthalate, polymethylpentene, polyimide.

8. The holographic data storage medium as claimed in claim 1, wherein the absorber layer comprises a binder.

9. The holographic data storage medium as claimed in claim 1, wherein the refractive index of the self-supporting polymer film can be changed locally by heating, it being possible for optical phase information to be stored via the local optical path length in the self-supporting polymer film.

10. The holographic data storage medium as claimed in claim 1, wherein the interface structure of the self-supporting polymer film can be changed locally by heating, it being possible for holographic information to be stored via the local interface structure of the self-supporting polymer film.

11. The holographic data storage medium as claimed in claim 1, wherein the absorber dye is set up such that its optical properties can be changed locally when it absorbs a write beam serving to write information.

12. The holographic data storage medium as claimed in claim 1, further comprising stored holographic information.

13. Use of a data storage medium comprising a self-supporting polymer film which is set up as a storage layer, can be changed locally by heating and which is set up as a top layer of the data storage medium, and comprising an absorber layer which is arranged underneath the self-supporting polymer film and has an absorber dye which is set up to at least partly absorb a write beam serving to write information and to discharge the heat produced by absorbing the write beam at least partly locally to the self-supporting polymer film, as a holographic data storage medium, wherein the data storage medium further comprises a partly transparent reflective layer arranged between the storage layer and the absorber layer.

14. The use as claimed in claim 13, wherein the data storage medium has the features of the holographic data storage medium as claimed in claim 2.

15. The use as claimed in claim 13, wherein the refractive index of the self-supporting polymer film can be changed locally by heating, it being possible for optical phase information to be stored via the local optical path length in the self-supporting polymer film and the self-supporting polymer film is transilluminated in transmission when reading out information.

16. The use as claimed in claim 13, wherein the interface structure of the self-supporting polymer film can be changed locally by heating, it being possible for holographic information to be stored via the local interface structure of the self-supporting polymer film.

17. The use as claimed in claim 16, wherein the holographic information is stored via the local interface structure of the self-supporting polymer film to the absorber layer.

18. The use as claimed in claim 13, wherein the absorber dye is set up such that its optical properties can be changed locally when it absorbs a write beam serving to write information.

19. A method of writing information into a holographic data storage medium comprising a self-supporting polymer film which is set up as a storage layer, which can be changed locally by heating and which is set up as a top layer of the data storage medium, and comprising an absorber layer which is arranged underneath the self-supporting polymer film and has an absorber dye which is set up to at least partly absorb a write beam serving to write information and to discharge the heat produced by absorbing the write beam at least partly locally to the self-supporting polymer film, the data storage medium further comprising a partly transparent reflective layer arranged between the storage layer and the absorber layer, the method comprising calculating holographic information contained in a hologram of a stored object as a two-dimensional array, aiming a write beam from a writing device at one or both of the self-supporting polymer film and the absorber layer of the data storage medium, and driving the write beam of the writing device in accordance with the two-dimensional array such that the local properties of the self-supporting polymer film are set in accordance with the holographic information.

20. The method as claimed in claim 19, wherein the write beam is aimed at the holographic data storage medium from the side of the top layer.

21. The method as claimed in claim 19, wherein the holographic information is stored in the form of pits of predefined size.

22. The method as claimed in claim 21, wherein the holographic information is stored in a pit in a binary encoded form.

23. The method as claimed in claim 21, wherein the holographic information is stored in a pit in continuously encoded form, the local properties of the self-supporting polymer film in the pit being set in accordance with a value from a predefined value range.

24. A method of reading information out of a holographic data storage medium comprising a self-supporting polymer film which is set up as a storage layer, which can be changed locally by heating and which is set up as a top layer of the data storage medium, and comprising an absorber layer which is arranged underneath the self-supporting polymer film and has an absorber dye which is set up to at least partly absorb a write beam serving to write information and to discharge the heat produced by absorbing the write beam at least partly locally to the self-supporting polymer film, the data storage medium further comprising a partly transparent reflective layer arranged between the storage layer and the absorber layer, the method comprising aiming light at a large area of the storage layer of the data storage medium and reconstructing the information contained in the irradiated region as a holographic image which is registered at a distance from the data storage medium.

25. The method according to claim 24, wherein the light comprises coherent light.

* * * * *